(12) United States Patent
Meyer et al.

(10) Patent No.: US 11,159,932 B1
(45) Date of Patent: Oct. 26, 2021

(54) ELECTRONIC DEVICES WITH INTUITIVE SHARING CAPABILITIES

(71) Applicant: Apple Inc., Cupertino, CA (US)

(72) Inventors: Adam S. Meyer, Cupertino, CA (US); Peter C. Tsoi, San Jose, CA (US); Stuart J. Wood, San Francisco, CA (US); Duncan Robert Kerr, San Francisco, CA (US); Martha Evans Hankey, San Francisco, CA (US); John B. Morrell, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/705,143

(22) Filed: Sep. 14, 2017

Related U.S. Application Data

(60) Provisional application No. 62/531,509, filed on Jul. 12, 2017, provisional application No. 62/395,929, filed on Sep. 16, 2016.

(51) Int. Cl.
*H04W 8/00* (2009.01)
*H04W 4/02* (2018.01)
(Continued)

(52) U.S. Cl.
CPC .......... *H04W 8/005* (2013.01); *G06F 3/0346* (2013.01); *H04M 1/724* (2021.01); *H04W 4/023* (2013.01);
(Continued)

(58) Field of Classification Search
CPC ..................................................... H04W 4/80
See application file for complete search history.

(56) References Cited

U.S. PATENT DOCUMENTS 8,219,028 B1 * 7/2012 Flamholz .............. G06F 1/1694
455/41.2
8,249,626 B2 8/2012 Huston
(Continued)

OTHER PUBLICATIONS

Fuentes-Pacheco, Jorge, et al., "Visual simultaneous localization and mapping: a survey", Spring Science + Business B.V., Dec. 2012, [Retrieved on Sep. 9, 2016], Retrieved from the Internet: <URL: https://www.researchgate.net/publication/234081012>.
(Continued)

*Primary Examiner* — Wen W Huang
(74) *Attorney, Agent, or Firm* — Treyz Law Group, P.C.; Kendall W. Abbasi

(57) ABSTRACT

An electronic device may use information about the location of nearby devices to make sharing with those devices more intuitive for a user. When two devices are pointed towards one another, each device may automatically present the option to share information with the other device. When a user wishes to share information with one or more devices in a group of users, an array of icons representing the nearby users may be positioned on the display according to the locations of the nearby users so that the sharing user can easily select which user he or she wishes to share with. A sharing user may broadcast a signal and nearby users may elect to receive the signal by pointing their devices towards the sharing user. A user of two devices may share information between the two devices and may use one device to manipulate the information on the other device.

19 Claims, 22 Drawing Sheets

(51) Int. Cl.
*H04M 1/725* (2006.01)
*G06F 3/0346* (2013.01)
*H04W 76/14* (2018.01)
*H04W 4/21* (2018.01)
*H04W 4/80* (2018.01)
*G06F 3/0488* (2013.01)
*G06F 3/0481* (2013.01)
*H04M 1/724* (2021.01)

(52) U.S. Cl.
CPC .............. *H04W 4/21* (2018.02); *H04W 4/80* (2018.02); *H04W 76/14* (2018.02); *G06F 3/04817* (2013.01); *G06F 3/04883* (2013.01)

(56) References Cited

U.S. PATENT DOCUMENTS

| | | | |
|---|---|---|---|
| 8,661,352 B2 | 2/2014 | Gronow et al. | |
| 8,842,003 B2 | 9/2014 | Huston | |
| 9,055,162 B2* | 6/2015 | Park | G06F 1/1601 |
| 9,232,353 B2* | 1/2016 | Bozarth | H04N 7/18 |
| 9,600,584 B2 | 3/2017 | Schloter | |
| 2008/0039212 A1* | 2/2008 | Ahlgren | H04M 1/7253 |
| | | | 463/46 |
| 2010/0087144 A1* | 4/2010 | Korenshtein | H04B 17/318 |
| | | | 455/41.2 |
| 2011/0070825 A1* | 3/2011 | Griffin | H04W 4/80 |
| | | | 455/41.1 |
| 2011/0081923 A1* | 4/2011 | Forutanpour | H04W 4/21 |
| | | | 455/457 |
| 2011/0083111 A1* | 4/2011 | Forutanpour | G06F 3/017 |
| | | | 715/863 |
| 2012/0258669 A1* | 10/2012 | Honkanen | G01S 3/46 |
| | | | 455/67.11 |
| 2013/0145287 A1* | 6/2013 | Jung | G06F 3/0486 |
| | | | 715/753 |
| 2013/0225078 A1* | 8/2013 | Johansson | H04W 76/10 |
| | | | 455/41.2 |
| 2013/0324169 A1* | 12/2013 | Kamal | H04W 4/80 |
| | | | 455/466 |
| 2014/0087654 A1* | 3/2014 | Kiveisha | H04B 5/0031 |
| | | | 455/41.1 |
| 2014/0206288 A1* | 7/2014 | Liu | H04W 12/04 |
| | | | 455/41.2 |
| 2014/0247346 A1* | 9/2014 | Bozarth | H04N 7/18 |
| | | | 348/143 |
| 2015/0236922 A1* | 8/2015 | Xiong | H04L 41/22 |
| | | | 715/748 |
| 2015/0279081 A1 | 10/2015 | Monk et al. | |
| 2015/0358760 A1* | 12/2015 | Kehm | H04W 4/04 |
| | | | 455/41.3 |
| 2015/0373091 A1* | 12/2015 | Sanghavi | H04W 4/21 |
| | | | 709/204 |
| 2016/0112839 A1* | 4/2016 | Choi | H04W 4/023 |
| | | | 455/41.2 |
| 2016/0360343 A1* | 12/2016 | Shi | H04W 76/14 |
| 2016/0360344 A1* | 12/2016 | Shim | H04L 12/2816 |

OTHER PUBLICATIONS

"Introduction to Real Time Location Systems", DecaWave, Application Note: APS003, 2014. p. 1-14, Dublin, Ireland.
"Sevenhugs Smart Remote: The Remote for Everything", Indiegogo, 25 pages, [Retrieved on Sep. 5, 2017], Retrieved from the Internet: <URL:https://www.indiegogo.com/projects/sevenhugs-smart-remote-the-remote>.
"Ultra-Wideband Location", NIST, Dec. 15, 2009, 3 pages, [Retrieved on Sep. 5, 2017], Retrieved from the Internet: <URL: https://www.nist.gov/programs-projects/ultra-wideband-location>.

* cited by examiner

ELECTRONIC DEVICES WITH INTUITIVE SHARING CAPABILITIES

This application claims the benefit of provisional patent application No. 62/531,509, filed Jul. 12, 2017, and provisional patent application No. 62/395,929, filed Sep. 16, 2016, both of which are hereby incorporated by reference herein in their entireties.

FIELD

This relates generally to electronic devices and, more particularly, to wireless electronic devices that are used to communicate with other wireless electronic devices.

BACKGROUND

Electronic devices often include wireless communications circuitry. For example, cellular telephones, computers, and other devices often contain antennas and wireless transceivers for supporting wireless communications.

Wireless electronic devices often communicate with other nearby wireless electronic devices. For example, a user may wirelessly share files with another nearby user over a short-range communications link such as Bluetooth® or WiFi®.

Sharing information wirelessly with nearby electronic devices can be cumbersome for a user. The user may have to take several steps to share information with another device. The user may not know when the device of another user is sufficiently close to establish a short-range wireless communications link. There may be multiple devices within range, making it challenging to safely and easily establish a communications link with the desired device. For example, when a user is in a public environment with a large number of unfamiliar devices, the user may have difficulty finding and selecting the desired device with which he or she desires to communicate wirelessly.

SUMMARY

An electronic device may be provided with wireless circuitry. The wireless circuitry may include one or more antennas. The antennas may include millimeter wave antenna arrays formed from arrays of millimeter wave antennas on millimeter wave antenna array substrates. The antennas may also include wireless local area network antennas, satellite navigation system antennas, cellular telephone antennas, and other antennas.

The electronic device may be provided with control circuitry and a display. The control circuitry may determine where nearby electronic devices are located relative to the electronic device. When a wireless communications link is established with a nearby device, the control circuitry may use the display to inform a user of the status of the wireless communications link and the location of the nearby device. The display may produce images that indicate where the nearby device is located such as a line extending in the direction of the nearby device. The line may move on the display in response to movement of the nearby device.

In an environment with multiple nearby devices that are in range for wireless communications, the display of an electronic device may show a notification for each nearby device. The location and size of each notification on the display may be based on the relative location and proximity of the associated nearby device. For example, larger notifications on the display may indicate a closer device, and a notification on the right hand side of the display may indicate the nearby device is on the right hand side of the electronic device.

The control circuitry may determine when the electronic device is oriented in a particular way relative to a nearby device. In response to determining that the electronic device is arranged end-to-end or side-to-side with another device, for example, the control circuitry may use wireless transceiver circuitry to automatically exchange information with the electronic device or may automatically prompt the user to indicate whether the user would like to exchange information with the electronic device.

An electronic device may use information about the location of nearby devices to make sharing with those devices more intuitive for a user. When two devices are pointed towards one another and/or when two devices are within an appropriate range of one another, each device may automatically present the option to share information with the other device. When a user wishes to share information with one or more devices in a group of users, an array of icons representing the nearby users may be positioned on the display according to the locations of the nearby users so that the sharing user can easily select which user he or she wishes to share with. A sharing user may broadcast a signal and nearby users may elect to receive the signal by pointing their devices towards the sharing user. A user of two devices may share information between the two devices and may use one device to manipulate the position and control of information on the other device.

DETAILED DESCRIPTION

In some wireless systems, the services that are provided may depend on the position of one wireless communications device relative to another wireless communications device. For example, consider a scenario in which a user of a first wireless device wishes to share information with a user of a second wireless device. When the two devices are within an appropriate range of one another, a short-range communications link may be established and information may be exchanged over the communications link.

In this type of scenario, it may be desirable for a user to not only know when a wireless communications link has been established, but also to easily control which device he or she exchanges information with. For example, in a crowded room where multiple wireless communications devices are close enough to establish a communications link, it may be desirable for the user to be better informed of which devices are near the user, where the devices are located relative to the user, and whether and with whom a communications link has been established. It may also be desirable for the user to have better and more intuitive control over which device the user shares information with, what information is shared, and when the information is communicated between the two devices.

Figure 1:
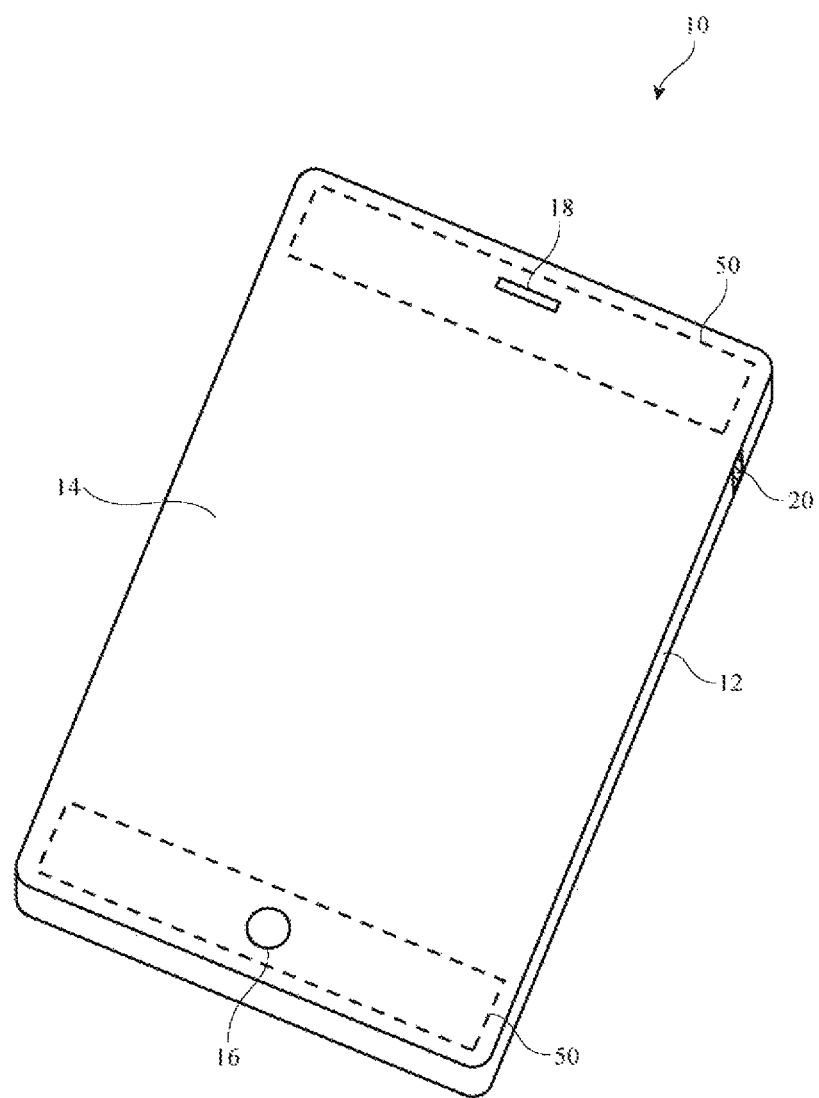
FIG. 1 is a perspective view of an illustrative electronic device with wireless communications circuitry and sensors in accordance with an embodiment.

An electronic device such as electronic device 10 of FIG. 1 may have control circuitry that determines where other objects or devices (sometimes referred to as nodes) are located relative to electronic device 10. The control circuitry in device 10 may synthesize information from cameras, motion sensors, wireless circuitry such as antennas, and other input-output circuitry to determine how far a node is relative to device 10 and/or to determine the orientation of device 10 relative to that node. The control circuitry may use output components in device 10 to provide output (e.g., display output, audio output, haptic output, or other suitable output) to a user of device 10 based on the position of the node.

Antennas in device 10 may include cellular telephone antennas, wireless local area network antennas (e.g., WiFi® antennas at 2.4 GHz and 5 GHz and other suitable wireless local area network antennas), satellite navigation system signals, and near-field communications antennas. The antennas may also include antennas for handling millimeter wave communications. For example, the antennas may include millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 10 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

As shown in FIG. 1, device 10 may include a display such as display 14. Display 14 may be mounted in a housing such as housing 12. For example, device 10 may have opposing front and rear faces and display 14 may be mounted in housing 12 so that display 14 covers the front face of device 10 as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). If desired, different portions of housing 12 may be formed from different materials. For example, housing sidewalls may be formed from metal and some or all of the rear wall of housing 12 may be formed from a dielectric such as plastic, glass, ceramic, sapphire, etc. Dielectric rear housing wall materials such as these may, if desired, by laminated with metal plates and/or other metal structures to enhance the strength of the rear housing wall (as an example).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels, an array of electrowetting pixels, or pixels based on other display technologies.

Display 14 may be protected using a display cover layer such as a layer of transparent glass, clear plastic, sapphire, or other transparent dielectric. Openings may be formed in the display cover layer. For example, an opening may be formed in the display cover layer to accommodate a button such as button 16. Buttons such as button 16 may also be formed from capacitive touch sensors, light-based touch sensors, or other structures that can operate through the display cover layer without forming an opening.

If desired, an opening may be formed in the display cover layer to accommodate a port such as speaker port 18. Openings may be formed in housing 12 to form communications ports (e.g., an audio jack port, a digital data port, etc.). Openings in housing 12 may also be formed for audio components such as a speaker and/or a microphone. Dielectric-filled openings 20 such as plastic-filled openings may be formed in metal portions of housing 12 such as in metal sidewall structures (e.g., to serve as antenna windows and/or to serve as gaps that separate portions of antennas from each other).

Antennas may be mounted in housing 12. If desired, some of the antennas (e.g., antenna arrays that may implement beam steering, etc.) may be mounted under dielectric portions of device 10 (e.g., portions of the display cover layer, portions of a plastic antenna window in a metal housing sidewall portion of housing 12, etc.). With one illustrative configuration, some or all of rear face of device 12 may be formed from a dielectric. For example, the rear wall of housing 12 may be formed from glass plastic, ceramic, other dielectric. In this type of arrangement, antennas may be mounted within the interior of device 10 in a location that allows the antennas to transmit and receive antenna signals through the rear wall of device 10 (and, if desired, through optional dielectric sidewall portions in housing 12). Antennas may also be formed from metal sidewall structures in housing 12 and may be located in peripheral portions of device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing, along the peripheral edges of housing 12, on the rear of housing 12, under the display cover layer that is used in covering and protecting display 14 on the front of device 10 (e.g., a glass cover layer, a sapphire cover layer, a plastic cover layer, other dielectric cover layer structures, etc.), under a dielectric window on a rear face of housing 12 or the edge of housing 12, under a dielectric rear wall of housing 12, or elsewhere in device 10. As an example, antennas may be mounted at one or both ends 50 of device 10 (e.g., along the upper and lower edges of housing 12, at the corners of housing 12, etc.).

Figure 2:
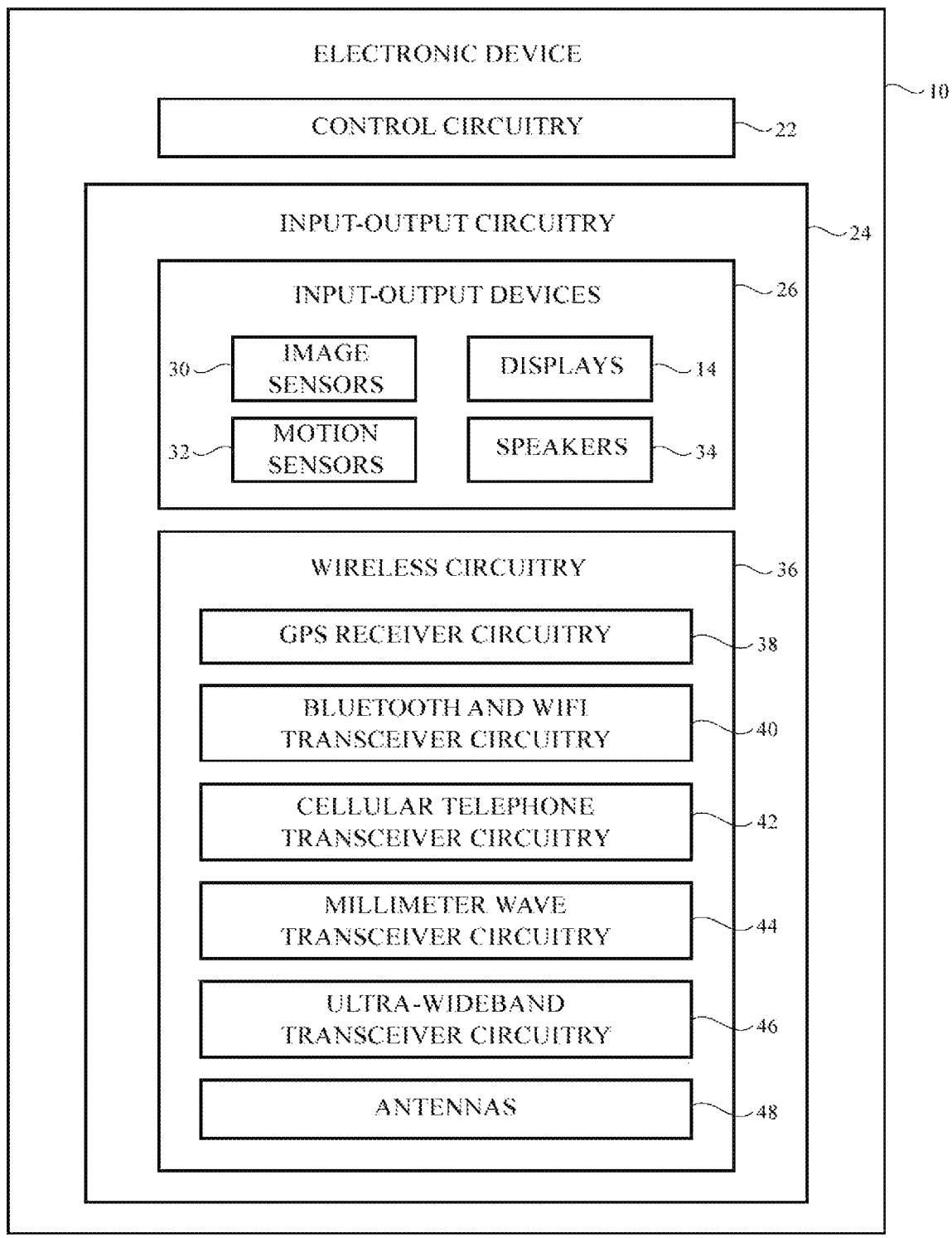
FIG. 2 is a schematic diagram of an illustrative electronic device with wireless communications circuitry and sensors in accordance with an embodiment.

A schematic diagram of illustrative components that may be used in device 10 is shown in FIG. 2. As shown in FIG. 2, device 10 may include storage and processing circuitry such as control circuitry 22. Control circuitry 22 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 22 may be used to control the operation of device 10. This processing circuitry may be based on one or more microprocessors, microcontrollers, digital signal processors, baseband processor integrated circuits, application specific integrated circuits, etc.

Control circuitry 22 may be used to run software on device 10, such as internet browsing applications, voice-over-internet-protocol (VOIP) telephone call applications, email applications, media playback applications, operating system functions, etc. To support interactions with external equipment, control circuitry 22 may be used in implementing communications protocols. Communications protocols that may be implemented using control circuitry 22 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, millimeter wave communications protocols, IEEE 802.15.4 ultra-wideband communications protocols, etc.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, and other input-output components. For example, input-output devices 26 may include one or more displays 14 (e.g., touch screens or displays without touch sensor capabilities), one or more image sensors 30 (e.g., digital image sensors), motion sensors 32, and speakers 34. Input-output devices 26 may also include buttons, joysticks, scrolling wheels, touch pads, key pads, keyboards, microphones, haptic elements such as vibrators and actuators, status indicators, light sources, audio jacks and other audio port components, digital data port devices, light sensors, capacitance sensors, proximity sensors (e.g., a capacitive proximity sensor and/or an infra-red proximity sensor), magnetic sensors, and other sensors and input-output components.

Image sensors 30 may include one or more visible digital image sensors (visible-light cameras) and/or one or more infrared digital image sensors (infrared-light cameras). Image sensors 30 may, if desired, be used to measure distances. For example, an infrared time-of-flight image sensor may be used to measure the time that it takes for an infrared light pulse to reflect back from objects in the vicinity of device 10, which may in turn be used to determine the distance to those objects. Visible imaging systems such as a front and/or rear facing camera in device 10 may also be used to determine the position of objects in the environment. For example, control circuitry 22 may use image sensors 30 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 22 may rely entirely upon image sensors 30 to perform simultaneous localization and mapping, or control circuitry 22 may synthesize image data with range data from one or more distance sensors (e.g., light-based proximity sensors). If desired, control circuitry 22 may use display 14 to display a visual representation of the mapped environment.

Motion sensors 32 may include accelerometers, gyroscopes, magnetic sensors (e.g., compasses), and other sensor structures. Sensors 32 of FIG. 2 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Motion sensors 32 may include circuitry for detecting movement and orientation of device 10. Motion sensors that may be used in sensors 32 include accelerometers (e.g., accelerometers that measure acceleration along one, two, or three axes), gyroscopes, compasses, pressure sensors, other suitable types of motion sensors, etc. Storage and processing circuitry 22 may be used to store and process motion sensor data. If desired, motion sensors, processing circuitry, and storage that form motion sensor circuitry may form part of a system-on-chip integrated circuit (as an example).

Other sensors that may be included in input-output devices 26 include ambient light sensors for gathering information on ambient light levels, proximity sensor components (e.g., light-based proximity sensors, capacitive proximity sensors, and/or proximity sensors based on other structures).

Input-output circuitry 24 may include wireless communications circuitry 36 for communicating wirelessly with external equipment. Wireless communications circuitry 36 may include radio-frequency (RF) transceiver circuitry formed from one or more integrated circuits, power amplifier circuitry, low-noise input amplifiers, passive RF components, one or more antennas 48, transmission lines, and other circuitry for handling RF wireless signals. Wireless signals can also be sent using light (e.g., using infrared communications).

Wireless communications circuitry 36 may include radio-frequency transceiver circuitry for handling various radio-frequency communications bands. For example, circuitry 36 may include transceiver circuitry 40, 42, 44, and 46.

Transceiver circuitry 40 may be wireless local area network transceiver circuitry. Transceiver circuitry 40 may handle 2.4 GHz and 5 GHz bands for WiFi® (IEEE 802.11) communications and may handle the 2.4 GHz Bluetooth® communications band.

Circuitry 36 may use cellular telephone transceiver circuitry 42 for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry 42 may handle voice data and non-voice data.

Millimeter wave transceiver circuitry 44 (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry 44 may support IEEE 802.1 1ad communications at 60 GHz. Circuitry 44 may be formed from one or more integrated circuits (e.g., multiple integrated circuits mounted on a common printed circuit in a system-in-package device, one or more integrated circuits mounted on different substrates, etc.).

Ultra-wideband transceiver circuitry 46 may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry 46 may operate in a 2.4 GHz frequency band and/or at other suitable frequencies.

Wireless communications circuitry 36 may include satellite navigation system circuitry such as Global Positioning System (GPS) receiver circuitry 38 for receiving GPS signals at 1575 MHz or for handling other satellite positioning data (e.g., GLONASS signals at 1609 MHz). Satellite navigation system signals for receiver 38 are received from a constellation of satellites orbiting the earth.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. Extremely high frequency (EHF) wireless transceiver circuitry 44 may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 36 can include circuitry for other short-range and long-range wireless links if desired. For example, wireless communications circuitry 36 may include circuitry for receiving television and radio signals, paging system transceivers, near field communications (NFC) circuitry, etc.

Antennas 48 in wireless communications circuitry 36 may be formed using any suitable antenna types. For example, antennas 48 may include antennas with resonating elements that are formed from loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 48 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 48 can be configured to receive both satellite navigation system signals and signals for other communications bands (e.g., wireless local area network signals and/or cellular telephone signals). Antennas 48 can include phased antenna arrays for handling millimeter wave communications.

In configurations for device 10 in which housing 12 has portions formed from metal, openings may be formed in the metal portions to accommodate antennas 48. For example, openings in a metal housing wall may be used in forming splits (gaps) between resonating element structures and ground structures in cellular telephone antennas. These openings may be filled with a dielectric such as plastic. As shown in FIG. 1, for example, a portion of plastic-filled opening 20 may run up one or more of the sidewalls of housing 12.

Figure 3:
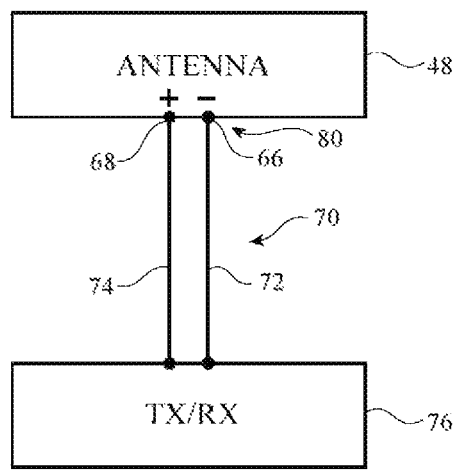
FIG. 3 is a diagram of an illustrative transceiver circuit and antenna in accordance with an embodiment.

A schematic diagram of a millimeter wave antenna or other antenna 48 coupled to transceiver circuitry 76 (e.g., wireless local area network transceiver circuitry 40, cellular telephone transceiver circuitry 42, millimeter wave transceiver circuitry 44, ultra-wideband transceiver circuitry 46, and/or other transceiver circuitry in wireless circuitry 36) is shown in FIG. 3. As shown in FIG. 3, radio-frequency transceiver circuitry 76 may be coupled to antenna feed 80 of antenna 48 using transmission line 70. Antenna feed 80 may include a positive antenna feed terminal such as positive antenna feed terminal 68 and may have a ground antenna feed terminal such as ground antenna feed terminal 66. Transmission line 70 may be formed from metal traces on a printed circuit or other conductive structures and may have a positive transmission line signal path such as path 74 that is coupled to terminal 68 and a ground transmission line signal path such as path 72 that is coupled to terminal 66. Transmission line paths such as path 70 may be used to route antenna signals within device 10. For example, transmission line paths may be used to couple antenna structures such as one or more antennas in an array of antennas to transceiver circuitry 76. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within transmission line 70 and/or circuits such as these may be incorporated into antenna 48 (e.g., to support antenna tuning, to support operation in desired frequency bands, etc.).

If desired, signals for millimeter wave antennas may be distributed within device 10 using intermediate frequencies (e.g., frequencies of about 5-15 GHz rather than 60 Hz). The intermediate frequency signals may, for example, be distributed from a baseband processor or other wireless communications circuit located near the middle of device 10 to one or more arrays of millimeter wave antennas at the corners of device 10. At each corner, upconverter and downconverter circuitry may be coupled to the intermediate frequency path. The upconverter circuitry may convert received intermediate frequency signals from the baseband processor to millimeter wave signals (e.g., signals at 60 GHz) for transmission by a millimeter wave antenna array. The downconverter circuitry may downconvert millimeter wave antenna signals from the millimeter wave antenna array to intermediate frequency signals that are then conveyed to the baseband processor over the intermediate frequency path.

Device 10 may contain multiple antennas 48. The antennas may be used together or one of the antennas may be switched into use while other antenna(s) are switched out of use. If desired, control circuitry 22 may be used to select an optimum antenna to use in device 10 in real time and/or to select an optimum setting for adjustable wireless circuitry associated with one or more of antennas 48. Antenna adjustments may be made to tune antennas to perform in desired frequency ranges, to perform beam steering with a phased antenna array, and to otherwise optimize antenna performance. Sensors may be incorporated into antennas 48 to gather sensor data in real time that is used in adjusting antennas 48.

In some configurations, antennas 48 may include antenna arrays (e.g., phased antenna arrays to implement beam steering functions). For example, the antennas that are used in handling millimeter wave signals for extremely high frequency wireless transceiver circuits 44 may be implemented as phased antenna arrays. The radiating elements in a phased antenna array for supporting millimeter wave communications may be patch antennas, dipole antennas, dipole antennas with directors and reflectors in addition to dipole antenna resonating elements (sometimes referred to as Yagi antennas or beam antennas), or other suitable antenna elements. Transceiver circuitry can be integrated with the phased antenna arrays to form integrated phased antenna array and transceiver circuit modules.

Figure 4:
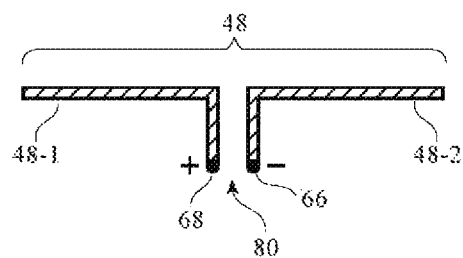
FIG. 4 is a diagram of an illustrative dipole antenna in accordance with an embodiment.

An illustrative dipole antenna is shown in FIG. 4. As shown in FIG. 4, dipole antenna 48 may have first and second arms such as arms 48-1 and 48-2 and may be fed at antenna feed 80. If desired, a dipole antenna such as dipole antenna 48 of FIG. 4 may be incorporated into a Yagi antenna (e.g., by incorporating a reflector and directors into dipole antenna 48 of FIG. 4).

Figure 5:
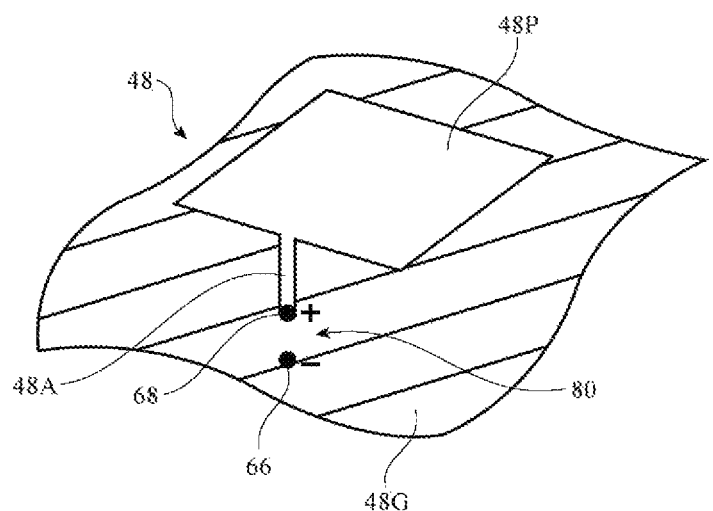
FIG. 5 is a perspective view of an illustrative patch antenna that may be used in an electronic device in accordance with an embodiment.

An illustrative patch antenna is shown in FIG. 5. As shown in FIG. 5, patch antenna 48 may have a patch antenna resonating element 48P that is separated from and parallel to a ground plane such as antenna ground plane 48G. Arm 48A may be coupled between patch antenna resonating element 48P and positive antenna feed terminal 68 of antenna feed 80. Ground antenna feed terminal 66 of feed 80 may be coupled to ground plane 48G.

Antennas of the types shown in FIGS. 4 and 5 and/or other antennas 48 may be used in forming millimeter wave antennas. The examples of FIGS. 4 and 5 are merely illustrative.

Figure 6:
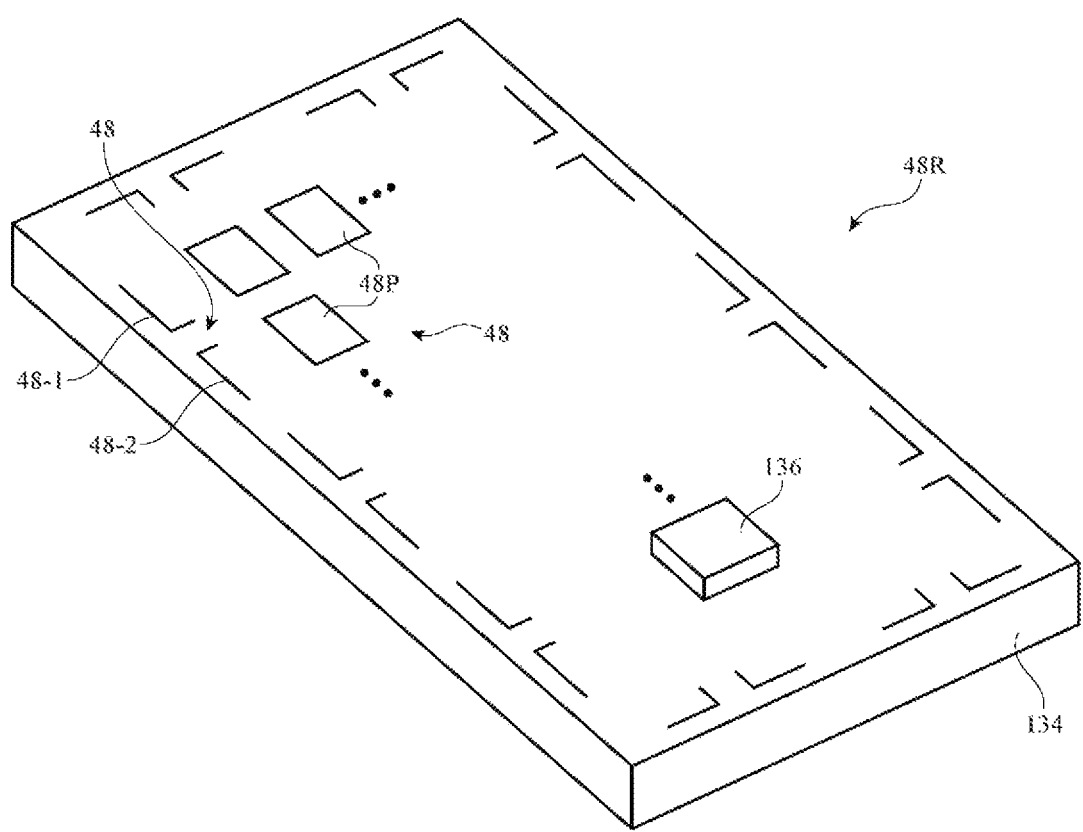
FIG. 6 is a perspective view of an illustrative array of millimeter wave antennas on a millimeter wave antenna array substrate in accordance with an embodiment.

FIG. 6 is a perspective view of an illustrative millimeter wave antenna array 48R formed from antenna resonating elements on millimeter wave antenna array substrate 134. Array 48R may include an array of millimeter wave antennas such as patch antennas 48 formed from patch antenna resonating elements 48P and dipole antennas 48 formed from arms 48-1 and 48-2. With one illustrative configuration, dipole antennas 48 may be formed around the periphery of substrate 134 and patch antennas 48 may form an array on the central surface of substrate 134. There may be any suitable number of millimeter wave antennas 48 in array 48R. For example, there may be 10-40, 32, more than 5, more than 10, more than 20, more than 30, fewer than 50, or other suitable number of millimeter wave antennas (patch antennas and/or dipole antennas, etc.). Substrate 134 may be formed from one or more layers of dielectric (polymer, ceramic, etc.) and may include patterned metal traces for forming millimeter wave antennas and signal paths. The signals paths may couple the millimeter wave antennas to circuitry such as one or more electrical devices 136 mounted on substrate 134. Device(s) 136 may include one or more integrated circuits, discrete components, upconverter circuitry, downconverter circuitry, (e.g., upconverter and downconverter circuitry that forms part of a transceiver), circuitry for adjusting signal amplitude and/or phase to perform beam steering, and/or other circuitry for operating antenna array 48R.

Figure 7:
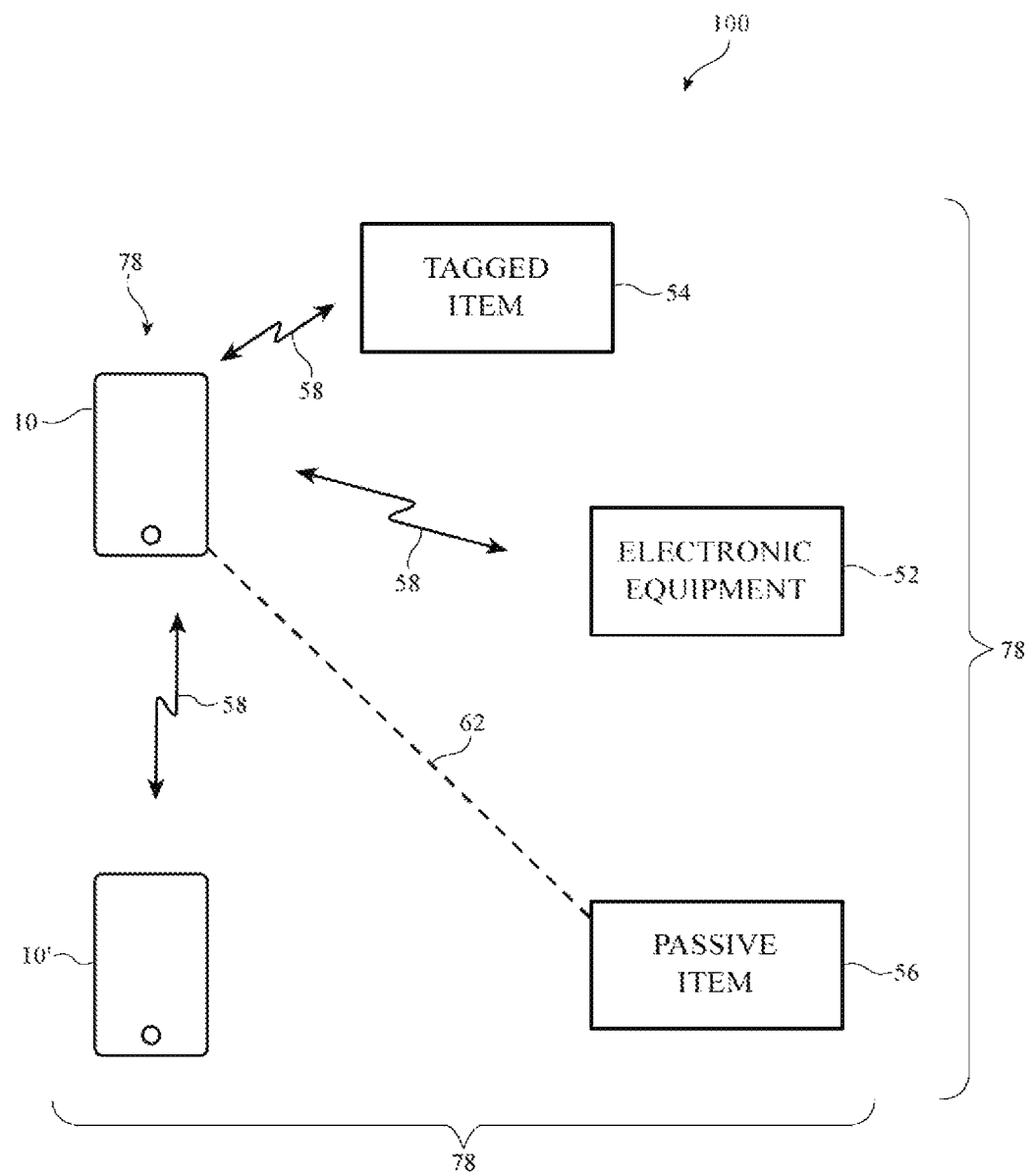
FIG. 7 is a diagram of an illustrative network having nodes in accordance with an embodiment.

FIG. 7 is a diagram of an illustrative network of objects that electronic device 10 may recognize and/or communicate wirelessly with. Network 100 may include nodes 78. Nodes 78 may be passive or active. Active nodes in network 100 may include devices that are capable of receiving and/or transmitting wireless signals such as signals 58. Active nodes in network 100 may include tagged devices such as tagged item 54, electronic equipment such as electronic equipment 52, and other electronic devices such as electronic devices 10' (e.g., devices of the type described in connection with FIG. 2, including some or all of the same wireless communications capabilities as device 10). Tagged item 54 may be any suitable object that has been provided with a wireless receiver and/or a wireless transmitter. For example, tagged device 54 may be a key fob, a cellular telephone, a wallet, a laptop, a book, a pen, or other object that has been provided with a low-power transmitter (e.g., an RFID transmitter or other transmitter). Device 10 may have a corresponding receiver that detects the transmitted signals 58 from device 54 and determines the location of device 54 based on the received signals. Tagged device 54 may be passive (e.g., may not include an internal power source and may instead be powered by electromagnetic energy from device 10 or other device) or may be active (e.g., may include an internal power source).

Electronic equipment 52 may be an infrastructure-related device such as a thermostat, a smoke detector, a Bluetooth® Low Energy (Bluetooth LE) beacon, a WiFi® wireless access point, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device.

Device 10 may communicate with communicate with nodes 54, 52, and 10' using communications signals 58. Communications signals 58 may include Bluetooth® signals, near-field communications signals, wireless local area signals such as IEEE 802.11 signals, millimeter wave communication signals such as signals at 60 GHz, ultra-wideband radio frequency signals, other radio-frequency wireless signals, infrared signals, etc. Wireless signals 58 may be used to convey information such as location and orientation information. For example, control circuitry 22 in device 10 may determine the location of active nodes 54, 52, and 10' relative to device 10 using wireless signals 58. Control circuitry 22 may also use image data from image sensors 30, motion sensor data from motion sensors 32, and other sensor data (e.g., proximity data from a proximity sensor, etc.) to determine the location of active nodes 54, 52, and 10'.

Passive nodes in network 100 such as passive object 56 may include objects that do not emit or receive radio-frequency signals such as furniture, buildings, doors, windows, walls, people, pets, and other items. Item 56 may be a tagged item that device 10 recognizes through feature tracking (e.g., using image sensor 30) or item 56 may be a virtually marked space that device 10 has assigned a set of coordinates to. For example, control circuitry 22 may construct a virtual three-dimensional space and may assign objects in the vicinity of device 10 coordinates in the virtual three-dimensional space based on their locations relative to device 10. In some arrangements, the virtual three-dimensional space may be anchored by one or more items with a known location (e.g., may be anchored by one or more tagged items 54 having a known location, electronic equipment 52 having a known location, or other items with a known location). Device 10 may then "tag" passive items such as item 56 by recording where passive item 56 is located relative to the anchored items in network 100. Device 10 may remember the virtual coordinates of passive item 56 and may take certain actions when device 10 is in a certain location or orientation relative to item 56. For example, if a user points device 10 in direction 62, control circuitry 10 may recognize that device 10 is being pointed at item 56 and may take certain actions (e.g., may display information associated with item 56 on display 14, may provide audio output via speakers 34, may provide haptic output via a vibrator or haptic actuator in device 10, and/or may take other suitable action). Because passive item 56 does not send or receive communication signals, circuitry 22 may use image data from image sensors 30, motion sensor data from motion sensors 32, and other sensor data (e.g., proximity data from a proximity sensor, etc.) to determine the location of passive item 56 and/or to determine the orientation of device 10 relative to item 56 (e.g., to determine when device 10 is being pointed at item 56).

Figure 8:
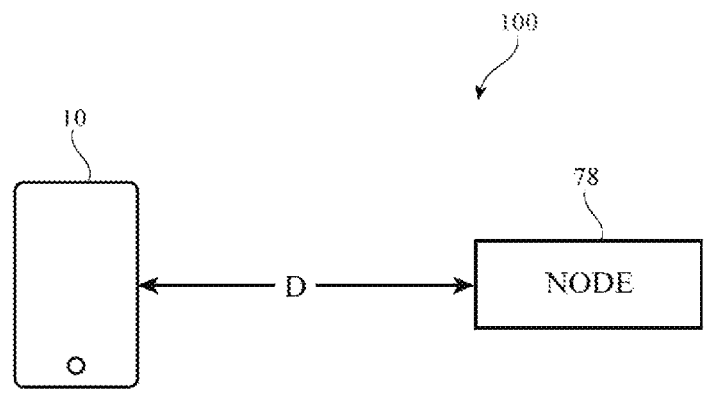
FIG. 8 is a diagram illustrating how a distance between an illustrative electronic device and a node in a network may be determined in accordance with an embodiment.

FIG. 8 shows how device 10 may determine a distance D between device 10 and node 78. In arrangements where node 78 is capable of sending or receiving communications signals (e.g., tagged item 54, electronic equipment 52, or other electronic devices 10' of FIG. 7), control circuitry 22 may determine distance D using communication signals (e.g., signals 58 of FIG. 7). Control circuitry 22 may determine distance D using signal strength measurement schemes (e.g., measuring the signal strength of radio signals from node 78) or using time based measurement schemes such as time of flight measurement techniques, time difference of arrival measurement techniques, angle of arrival measurement techniques, triangulation methods, time-of-flight methods, using a crowdsourced location database, and other suitable measurement techniques. This is merely illustrative, however. If desired, control circuitry 22 may determine distance D using Global Positioning System receiver circuitry 38, using proximity sensors (e.g., infrared proximity sensors or other proximity sensors), using image data from camera 30, motion sensor data from motion sensors 32, and/or using other circuitry in device 10.

In arrangements where node 78 is a passive object that does not send or receive wireless communications signals, control circuitry 22 may determine distance D using proximity sensors (e.g., infrared proximity sensors or other proximity sensors), using image data from camera 30, and/or using other circuitry in device 10. In some arrangements, device 10 may "tag" passive items by recording where passive item 56 is located relative to other items in network 100. By knowing the location of item 56 relative to anchored nodes in network 100 and knowing the location of the anchored nodes relative to device 10, device 10 can determine the distance D between device 10 and node 78.

Figure 9:
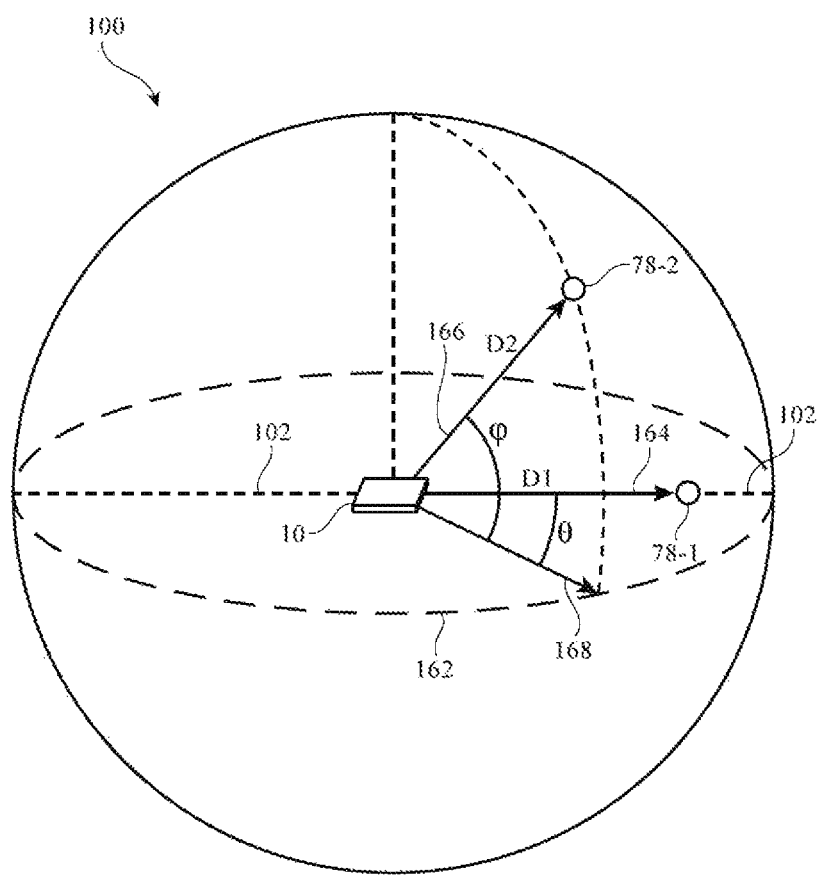
FIG. 9 is a diagram showing how a location and orientation of an illustrative electronic device relative to nodes in a network may be determined in accordance with an embodiment.

In addition to determining the distance between device 10 and nodes 78 in network 100, control circuitry 22 may be configured to determine the orientation of device 10 relative to nodes 78. FIG. 9 illustrates how the position and orientation of device 10 relative to nearby nodes such as first node 78-1 and second node 78-2 may be determined. If desired, control circuitry 22 may use a horizontal coordinate system to determine the location and orientation of device 10 relative to nodes 78-1 and 78-2. In this type of coordinate system, control circuitry 22 may determine an azimuth angle θ and elevation angle φ to describe the position of nearby nodes 78 relative to device 10. Control circuitry 22 may define a reference plane such as local horizon 162 and a reference vector such as reference vector 164. Local horizon 162 may be a plane that intersects device 10 and that is defined relative to a surface of device 10. For example, local horizon 162 may be a plane that is parallel to or coplanar with display 14 of device 10. Reference vector 164 (sometimes referred to as the "north" direction) may be a vector in local horizon 162. If desired, reference vector 164 may be aligned with longitudinal axis 102 of device 10 (e.g., an axis running lengthwise down the center of device 10). When reference vector 164 is aligned with longitudinal axis 102 of device 10, reference vector 164 may correspond to the direction in which device 10 is being pointed.

Azimuth angle θ and elevation angle φ may be measured relative to local horizon 162 and reference vector 164. As shown in FIG. 9, the elevation angle φ (sometimes referred to as altitude) of node 78-2 is the angle between node 78-2 and device 10's local horizon 162 (e.g., the angle between vector 166 extending between device 10 and node 78-2 and a coplanar vector 168 extending between device 10 and horizon 162). The azimuth angle θ of node 78-2 is the angle of node 78-2 around local horizon 162 (e.g., the angle between reference vector 164 and vector 168).

In the example of FIG. 9, the azimuth angle and elevation angle of node 78-1 are both 0° because node 78-1 is located in the line of sight of device 10 (e.g., node 78-1 intersects with reference vector 164 and horizontal plane 162). The azimuth angle θ and elevation angle φ of node 78-2, on the other hand, is greater than 0°. Control circuitry 22 may use a threshold azimuth angle and/or a threshold elevation angle to determine whether a nearby node is sufficiently close to the line of sight of device 10 to trigger appropriate action.

Control circuitry 22 may also determine the proximity of nearby nodes 78 relative to device 10. As shown in FIG. 9, for example, control circuitry 22 may determine that node 78-1 is a distance D1 from device 10 and that node 78-2 is a distance D2 from device 10. Control circuitry 22 may determine this type of orientation information using wireless communications signals (e.g., signals 58 of FIG. 7), using proximity sensors (e.g., infrared proximity sensors or other proximity sensors), motion sensor data from motion sensors 32 (e.g., data from an accelerometer, a gyroscope, a compass, or other suitable motion sensor), using image data from camera 30, and/or using other circuitry in device 10. Control circuitry 22 may use a threshold distance to determine whether a nearby node is sufficiently close to device 10 to trigger appropriate action.

If desired, other axes besides longitudinal axis 102 may be used as reference vector 164. For example, control circuitry 22 may use a horizontal axis that is perpendicular to longitudinal axis 102 as reference vector 164. This may be useful in determining when nodes 78 are located next to a side portion of device 10 (e.g., when device 10 is oriented side-to-side with one of nodes 78).

After determining the orientation of device 10 relative to nodes 78-1 and 78-2, control circuitry 22 may take suitable action. For example, in response to determining that node 78-1 is in the line of sight of device 10 and/or within a given range of device 10, control circuitry 22 may send information to node 78-1, may request and/or receive information from 78-1, may use display 14 to display a visual indication of wireless pairing with node 78-1, may use speakers 34 to generate an audio indication of wireless pairing with node 78-1, may use a vibrator, a haptic actuator, or other mechanical element to generate haptic output indicating wireless pairing with node 78-1, and/or may take other suitable action.

In response to determining that node 78-2 is located at azimuth angle θ, elevation angle φ, and distance D2, relative to device 10, control circuitry 22 may use display 14 to display a visual indication of the location of node 78-2 relative to device 10, may use speakers 34 to generate an audio indication of the location of node 78-2, may use a vibrator, a haptic actuator, or other mechanical element to generate haptic output indicating the location of node 78-2, and/or may take other suitable action.

Figure 10:
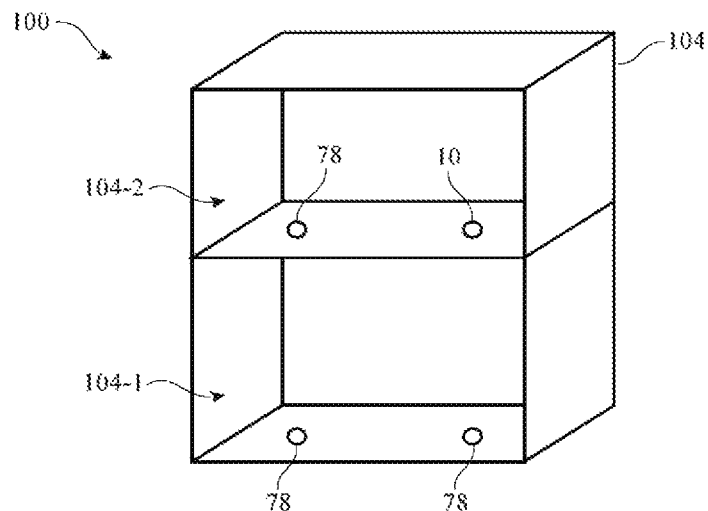
FIG. 10 is a perspective view of an illustrative scene in which the location and orientation of a node relative to other nodes in a network may be determined in accordance with an embodiment.

FIG. 10 illustrates a scenario in which the locations of nodes 78 are determined relative to other nodes 78 in network 100. In this type of scenario, device 10 does not know the absolute location of nodes 78 in network 100. However, control circuitry 22 may determine the relative location of nodes 78 using signal strength measurement schemes (e.g., measuring the signal strength of radio signals from nodes 78) or using time based measurement schemes such as time of flight measurement techniques, time difference of arrival measurement techniques, angle of arrival measurement techniques, triangulation methods, time-of-flight methods, using a crowdsourced location database, and other suitable measurement techniques. For example, device 10 on second floor 104-2 of building 104 may determine that one node 78 is directly below it on first floor 104-1 of building 104 and that another node 78 is located on the same floor as device 10 at a certain distance away.

Figure 11:
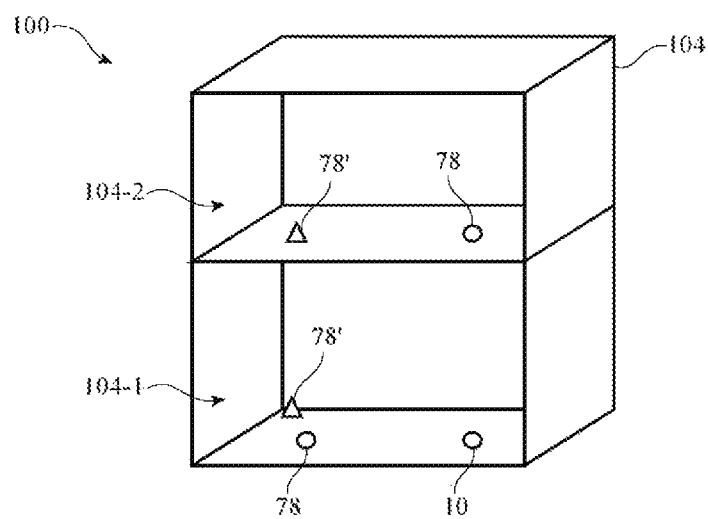
FIG. 11 is a perspective view of an illustrative scene in which the absolute location and orientation of a node may be determined using anchored nodes in a network in accordance with an embodiment.

FIG. 11 illustrates a scenario in which the absolute locations of nodes 78 are determined using anchored nodes 78' in network 100. In this type of arrangement, device 10 knows the locations (e.g., geographic coordinates) of anchored nodes 78' (e.g., a wireless access point, a beacon, or other electronic equipment 52, a tagged item 54 with a known location, etc.) and uses this information to determine the absolute location of nodes 78 (e.g., nodes with unknown locations). Thus, in addition to determining that one of nodes 78 is directly above device 10, control circuitry 22 may determine the absolute location of nodes 78 (e.g., the geographic coordinates of nodes 78).

Control circuitry 22 may use one or more output devices in device 10 to provide information on nearby nodes 78 to a user of device 10. The information may include, for example, how many nodes 78 are nearby, how close nodes 78 are to device 10, where nodes 78 are located in relation to device 10, whether or not a wireless communications link has been or can be established, the type of information that device 10 can send to or receive from nodes 78, and/or other suitable information. Control circuitry 22 may provide this type of information to a user with images on display 14, audio from speakers 34, haptic output from a vibrator, haptic actuator, or other haptic element, light from a light source such as a status indicator, and/or other output components in device 10.

Figure 12:
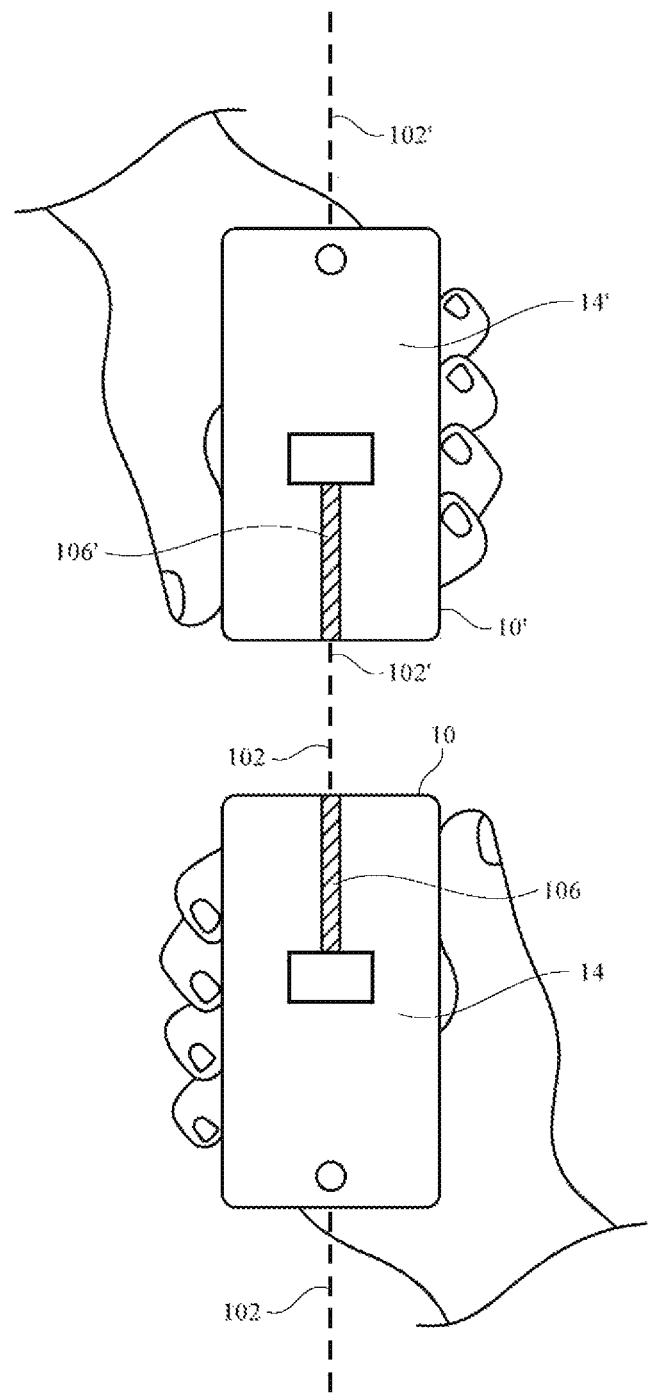
FIG. 12 is a top view of illustrative electronic devices showing how each user may be informed of an established wireless communications link in accordance with an embodiment.

It may be desirable for a user to know when and with what device a wireless communications link has been established. FIG. 12 illustrates an example in which control circuitry uses display 14 to produce a visual representation of a wireless communications link that has been established between device 10 and device 10'. In this example, display 14 displays a tether such as tether 106 that appears to physically link device 10' to device 10. Tether 106 may be an image of a line, rope, chain, cord, pattern (e.g., dots, lines, circles, etc.), or other display object that is aligned toward device 10'. Device 10' may generate a similar image such as tether 106'. Tether 106 and 106' may point toward one another to give the appearance of a physical string between device 10' and device 10. If desired, tether 106 and tether 106' may extend to the edge of displays 14 and 14', respectively, or tether 106 and 106' may stop short of the edge of displays 14 and 14'. respectively.

Control circuitry 22 may produce tether 106 when device 10 comes within a certain distance of device 10' and/or when device 10 is oriented at a given angle with respect to device 10'. Control circuitry 22 may, for example, determine the angle between longitudinal axis 102 of device 10 and longitudinal axis 102' of device 10'. When control circuitry 22 detects that longitudinal axis 102 aligns with longitudinal axis 102 (e.g., when a user points the top end of device 10 at device 10') and that device 10' is within a given distance of device 10 (e.g., 10 feet, 20 feet, 30 feet, 50 feet, more than 50 feet, less than 50 feet, or other threshold distance), control circuitry 22 may display a visual indication of the wireless connection (e.g., a wireless communications link) that can be or has been established between device 10 and device 10'.

Figure 13:
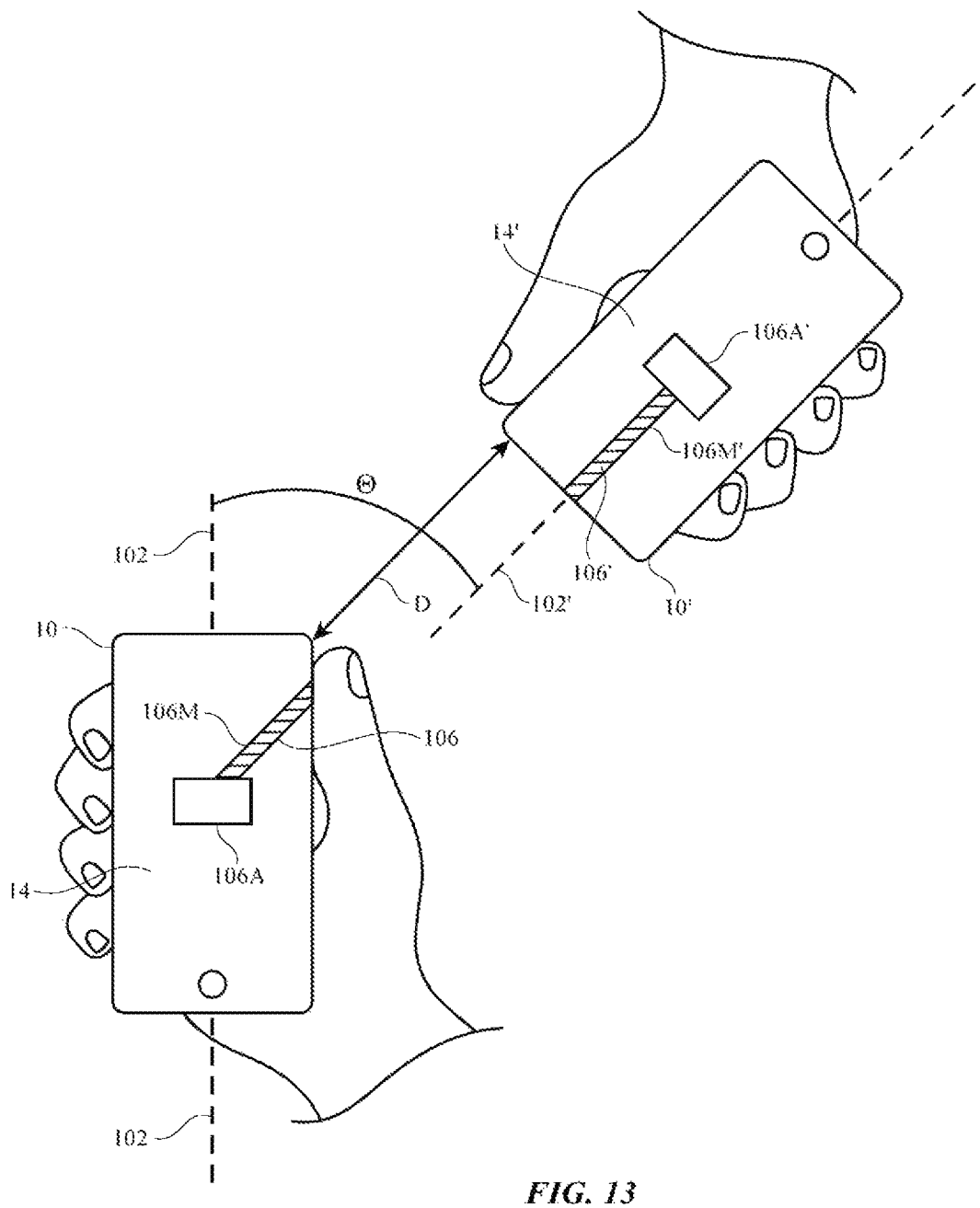
FIG. 13 is a top view of illustrative electronic devices showing how each user may be informed of the location and orientation of the other user's electronic device when a wireless communications link is established in accordance with an embodiment.

Device 10 need not directly point at device 10' in order to establish a wireless communications link with device 10'. FIG. 13 illustrates an example in which longitudinal axis 102 of device 10 and longitudinal axis 102' of device 10' are separated by angle θ. When angle θ angle is less than a predetermined threshold and distance D is less than a predetermined threshold, control circuitry 22 may display a visual indication of the wireless link that can be or has been established between devices 10 and 10'.

If desired, the visual indication such as tether 106 may change according to where and how devices 10 and 10' are located and oriented relative to one another. As shown in FIG. 13, for example, the location of tether 106 and 106' may change according to where devices 10 and 10' are located relative to one another. Tether 106 may have an anchored portion such as anchored portion 106A and a moveable portion such as portion 106M. Moveable portion 106M may rotate around anchored portion 106A based on where device 10' is located. Similarly, tether 106' may have a moveable portion 106M' that rotates around an anchored portion 106A' based on where device 10 is located. This not only informs the user of when a wireless connection is established, but it also informs the user of where device 10' is located relative to device 10, which can help avoid unintended connections with other devices in the vicinity of device 10.

Figure 14:
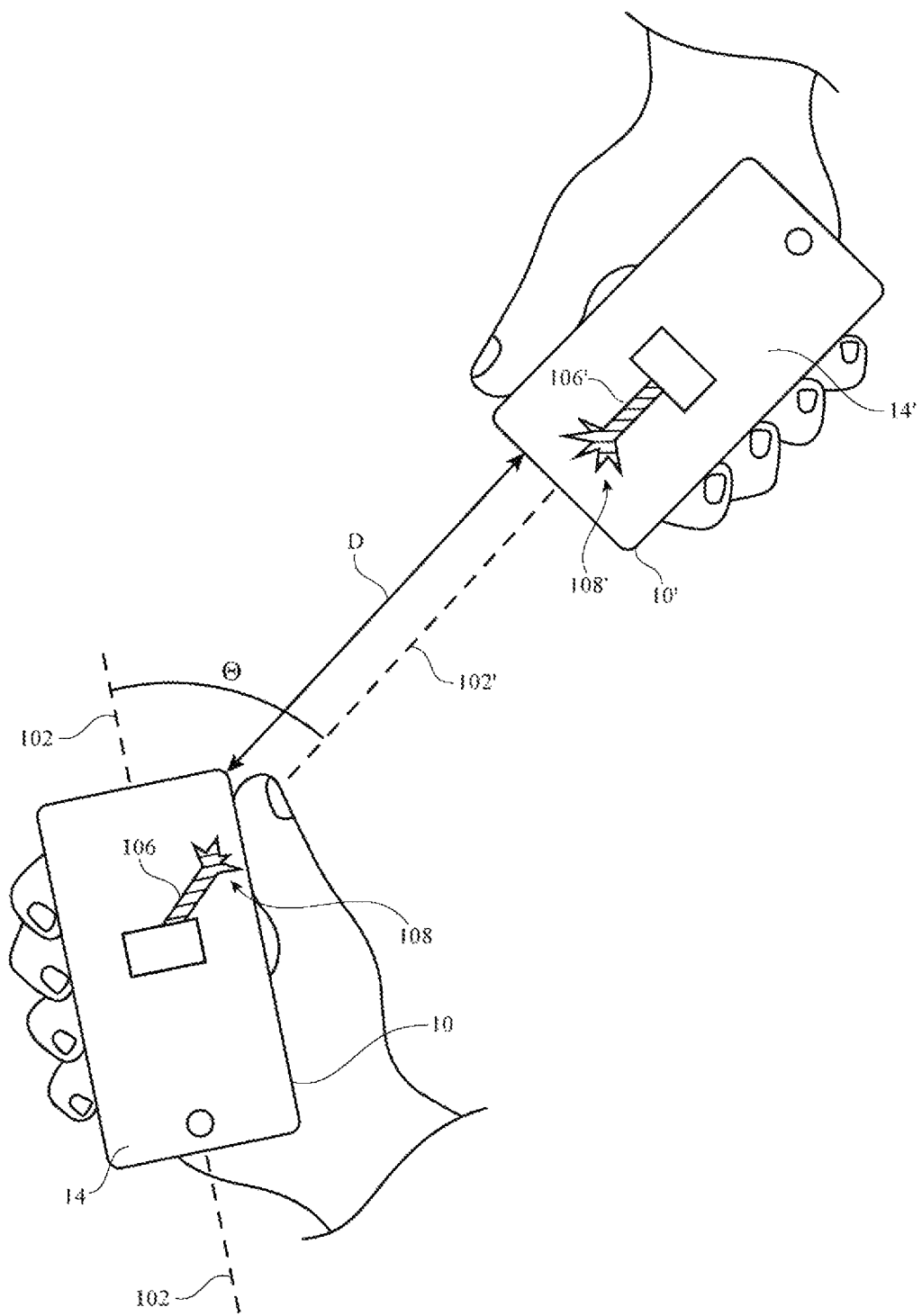
FIG. 14 is a top view of illustrative electronic devices showing how each user may be informed of a broken wireless communications link in accordance with an embodiment.

FIG. 14 shows how control circuitry 22 may use display 14 to provide a visual indication of a broken or inactive communications link. When control circuitry 22 detects that the distance D between devices 10 and 10' exceeds a predetermined threshold distance or that angle θ exceeds a predetermined threshold angle, control circuitry 22 may break the wireless communications link between devices 10 and 10' (or this may occur automatically if the wireless connection is too weak). In the example of FIG. 14, display 14 shows a broken end such as broken end 108 on tether 106. Likewise, display 14' may show broken end 108' on tether 106'. This helps inform the user of that the wireless communications link between device 10 and device 10' is no longer established. The example of a broken or torn end of a tether is merely illustrative. In general, display 14 may generate any suitable visual indication to show the user that device 10 is no longer wirelessly paired with device 10'.

Figure 15:
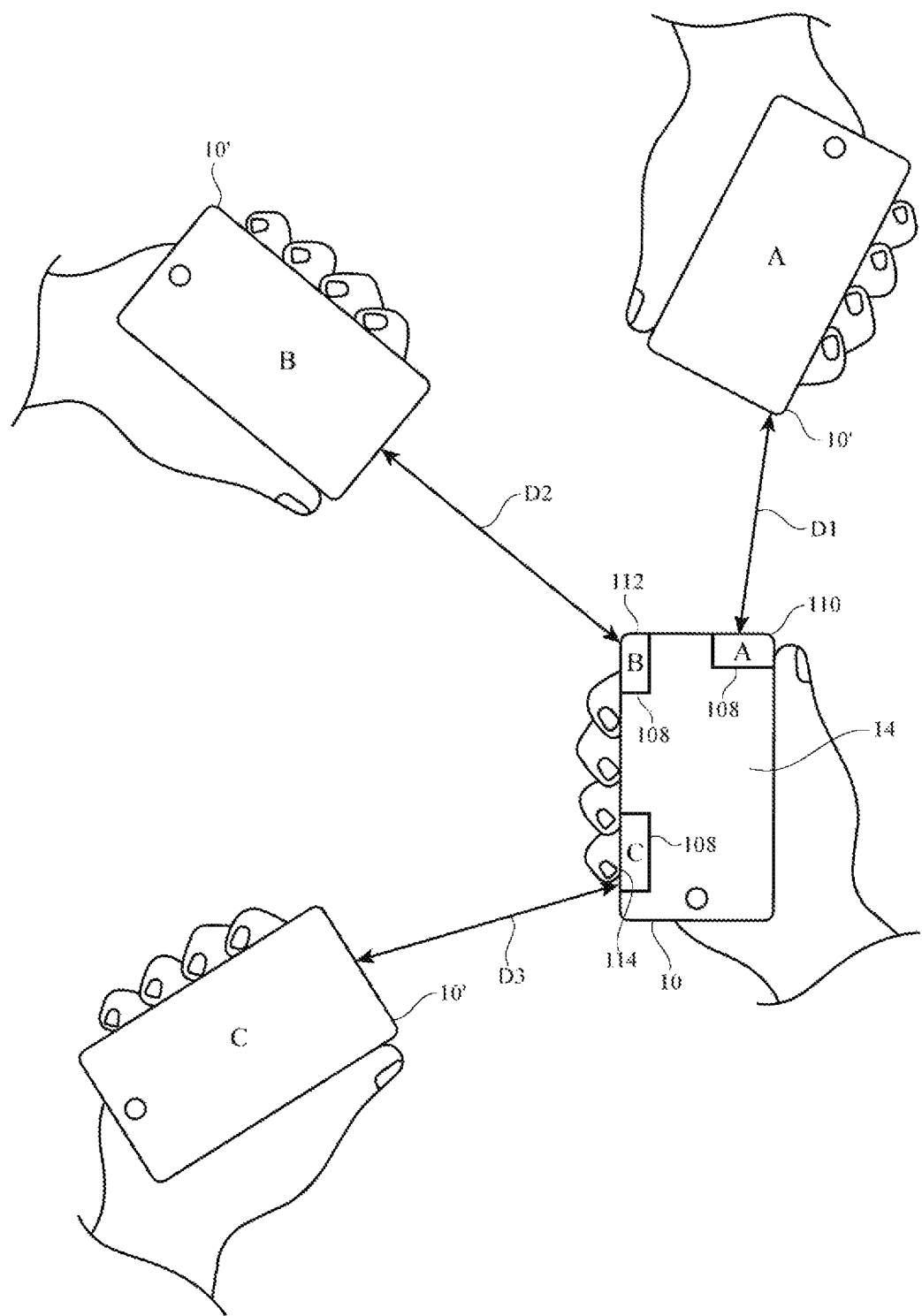
FIG. 15 is a top view of illustrative electronic devices showing how a user may be informed of the position of nearby electronic devices in accordance with an embodiment.

FIG. 15 illustrates an example in which device 10 is operating in an environment where multiple devices are within sufficient range to establish a wireless communications link. Display 14 may present images to show the user of device 10 which devices 10' are nearby and where they are located relative to device 10. This may be done purely with text on display 14 (e.g., device A is 5 feet away, device B is 6 feet away, and device C is 5 feet away) or may be achieved with visual aids on display 14 that help the user more quickly assess which devices are nearby and where they are located relative to device 10. A user may then select which device it wants to exchange information with (e.g., send information to or receive information from) by selecting the appropriate notification 108. In response to receiving user input indicating which device 10' the user of device 10 wishes to exchange information with, control circuitry 22 may establish the wireless communications link with that device 10' (e.g., using wireless transceiver circuitry) so that information can be exchanged over the wireless communications link. If desired, display 14 may display an image of the type shown in FIG. 12 to inform the user that device 10 is wirelessly communicating with the selected device 10'.

As shown in FIG. 15, display 14 may generate a notification such as notification 108 for each device 10' within a given distance of device 10. The locations of notifications 108 on display 14 may correspond to where devices 10' are respectively located relative to device 10 (e.g., where devices 10' are located relative to longitudinal axis 102). For example, device A is closest to top right corner 110 of device 10 and notification 108 for device A may therefore be located on the top right corner of display 14. Device B is closest to top left corner 114 of device 10 and notification 108 for device B may therefore be located on the top left corner of display 14. Device C is closest to the lower left hand side 114 of device 10 and notification 108 for device C may therefore be located on the lower left hand side of display 14. When one of devices 10' moves relative to electronic device 10, control circuitry 22 may change the location of notification 108 on display 14 accordingly. For example, if devices A and B were to switch places, notifications 108 for devices A and B may also switch locations on display 14, if desired.

In addition to having locations on display 14 that clue the user in as to which side of device 10 other devices 10' are located, notifications 108 may provide a visual indication of the proximity of devices 10' to device 10. For example, the color, size, shape, pattern, font, style, or other characteristic of notifications 108 may be adjusted according to distances D1, D2, and D3 between device 10 and devices A, B, and C, respectively. If D1 is smaller than D2, for example, notification 108 for device A may be larger than notification 108 for device B, indicating to the user of device 10 that device A is closer than device B.

Figure 16:
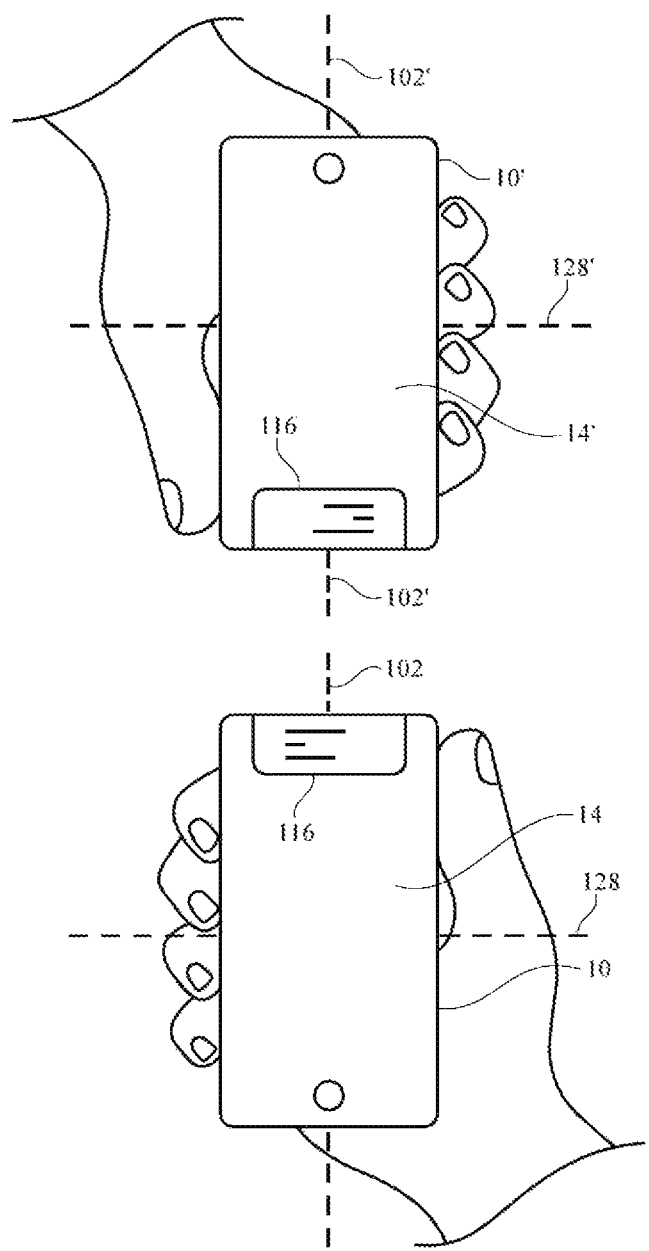
FIG. 16 is a top view of illustrative electronic devices showing how information may be exchanged when the electronic devices are placed next to one another in accordance with an embodiment.

FIG. 16 shows an example in which information such as information 116 is shared between two devices such as device 10 and device 10'. Similar to the example of FIG. 12, a wireless communications link may be established between device 10 and device 10' when device 10' is within a predetermined threshold distance of device 10. In some scenarios, a user may only wish to share information 116 when device 10 is oriented in a particular way relative to device 10'. In other scenarios, it may be desirable to automatically share certain kinds of information 116 when device 10 is oriented in a particular way relative to another device 10'.

To address these scenarios, control circuitry 22 may take certain actions when device 10 and device 10' are positioned and oriented in a particular way with respect to one another. In the example of FIG. 16, control circuitry 22 takes action with respect to information 116 when longitudinal axes 102 and 102' align (e.g., when the top ends of devices 10 and 10' face one another and the angle between the two axes is less than a predetermined threshold angle.). This is, however, merely illustrative. If desired, control circuitry 22 may take action with respect to information 116 when devices 10 and 10' are arranged side-to-side (e.g., when longitudinal axis 102 and 102' are parallel) or are arranged in any other suitable manner that is intended to trigger the exchange of information 116.

If desired, other axes may be used to determine the orientation of device 10 relative to device 10'. For example, control circuitry 22 may determine where device 10' is located relative to horizontal axis 128 that runs cross-wise through device 10 (e.g., a side-to-side axis that extends between left and right sides of device 10 and is perpendicular to longitudinal axis 102). When horizontal axis 128 is used as a reference, control circuitry 22 may determine the angle between horizontal axis 128 of device 10 and horizontal axis 128' of device 10. Control circuitry 22 may determine that device 10 and device 10' are arranged side-to-side when their horizontal axes align and/or when the angle between the two axes is less than a predetermined threshold angle.

Upon determining that device 10 and device 10' are oriented end-to-end, side-to-side, or other suitable trigger orientation, control circuitry 22 may take suitable action with respect to information 116. This may include, for example, displaying information 116 on display 14 so that a user of device 10 can confirm that the user wishes to send information 116 to device 10', or it may include automatically sending information 116 to device 10'. As an example, information 116 may include contact information. If the user of device 10 wishes to exchange contact information with the user of device 10', the two users may place devices 10 and 10' in the appropriate trigger location (e.g., end-to-end as shown in the example of FIG. 16, side-to-side, or other suitable arrangement). Upon detecting that device 10 and device 10' are in the appropriate trigger location, control circuitry 22 may automatically send contact information 116 to device 10' or may prompt the user to take action before sending contact information 116 to device 10' (e.g., may prompt a user to provide touch input, audio input, motion/gesture input, or other suitable input to cause control circuitry 22 to send contact information 116 to device 10').

Figure 17:
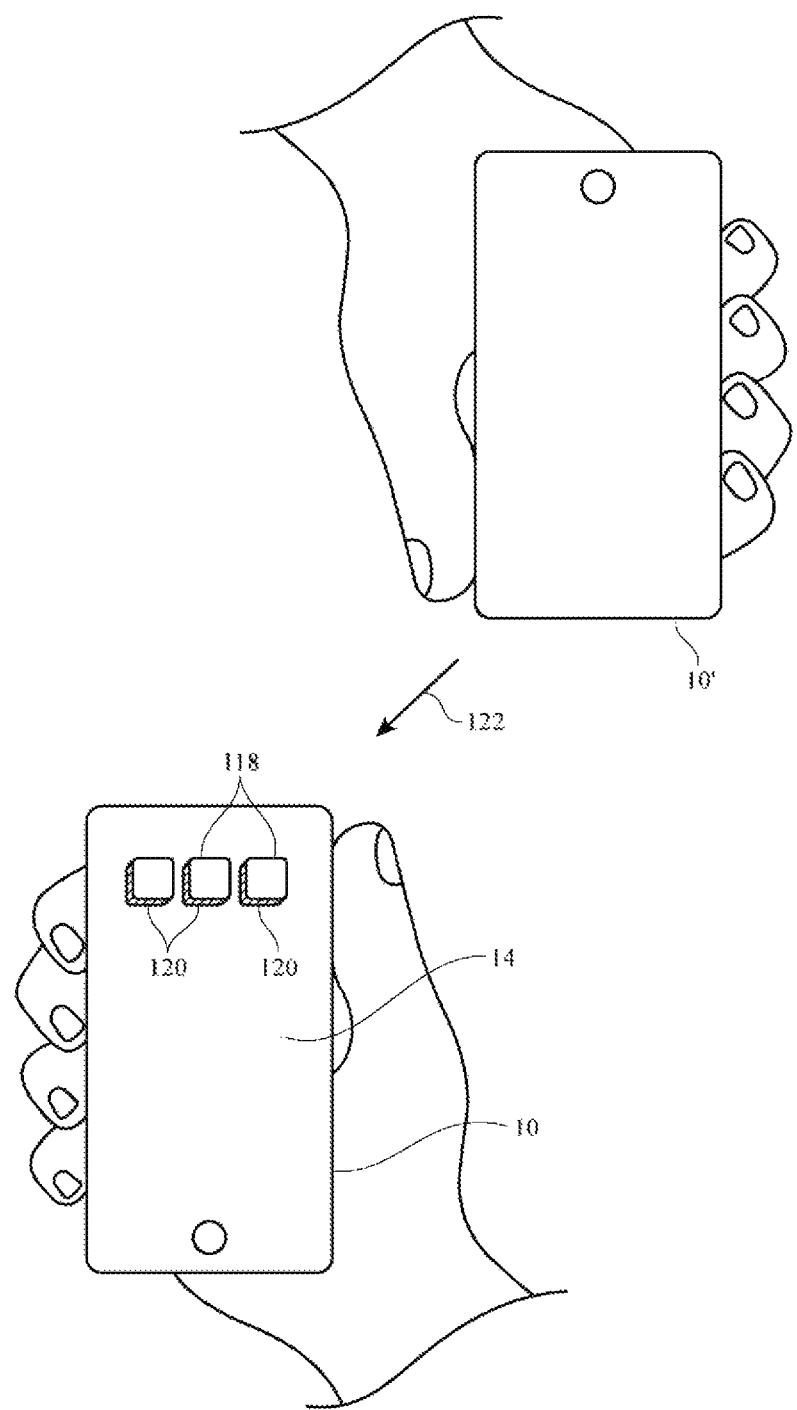
FIGS. 17 and 18 are top views of illustrative electronic devices showing how display elements may be modified based on the position of a nearby electronic device in accordance with an embodiment.
Figure 18:
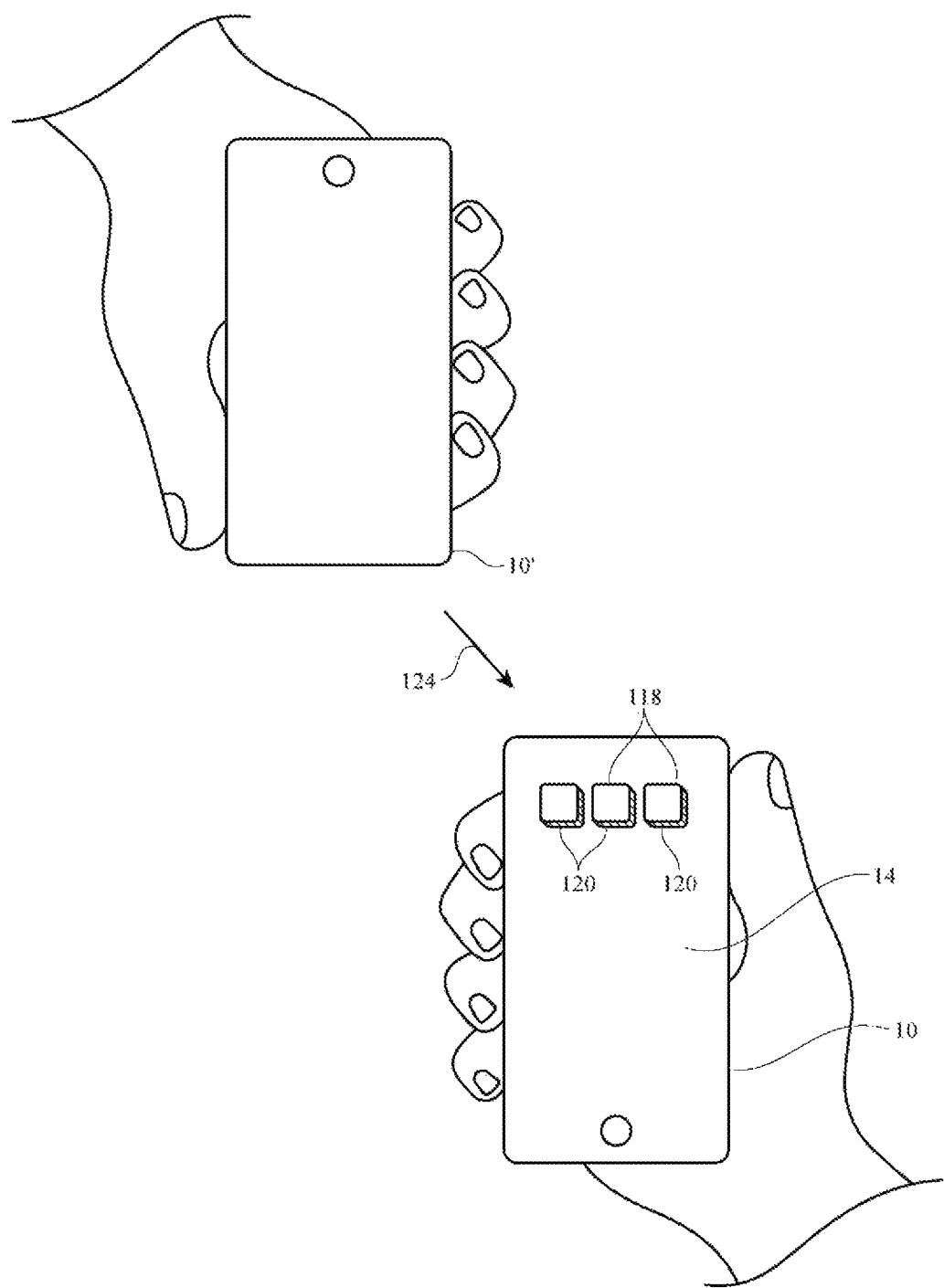

FIGS. 17 and 18 illustrate how device 10 may provide other types of output for a user to inform the user where nearby devices are located relative to device 10. Control circuitry 22 may, for example, adjust user interface elements on display 14 based on where other devices such as device 10' are located relative to device 10. This may include, for example, creating images with shadows on display 14 that clue the user of device 10 in as to where device 10' is located. For example, as shown in FIG. 17, display 14 may have user interface elements 118. Shadows 120 may be displayed on the lower left corner of elements 118 when device 10' is to the right of device 10 (e.g., where device 10' would be casting a shadow in direction 122). As shown in FIG. 18, shadows 120 may be displayed on the lower right corner of element 118 when device 10 is to the left of device 10 (e.g., where device 10' would be casting a shadow in direction 124).

This is, however, merely illustrative. In general, any display change may be used to inform the user of device 10 as to the location of other devices 10' in its vicinity. Display changes may include background changes, icon changes, or other suitable changes (e.g., changes in shape, shade, location, size, or other characteristic of elements on display 14).

Figure 19:
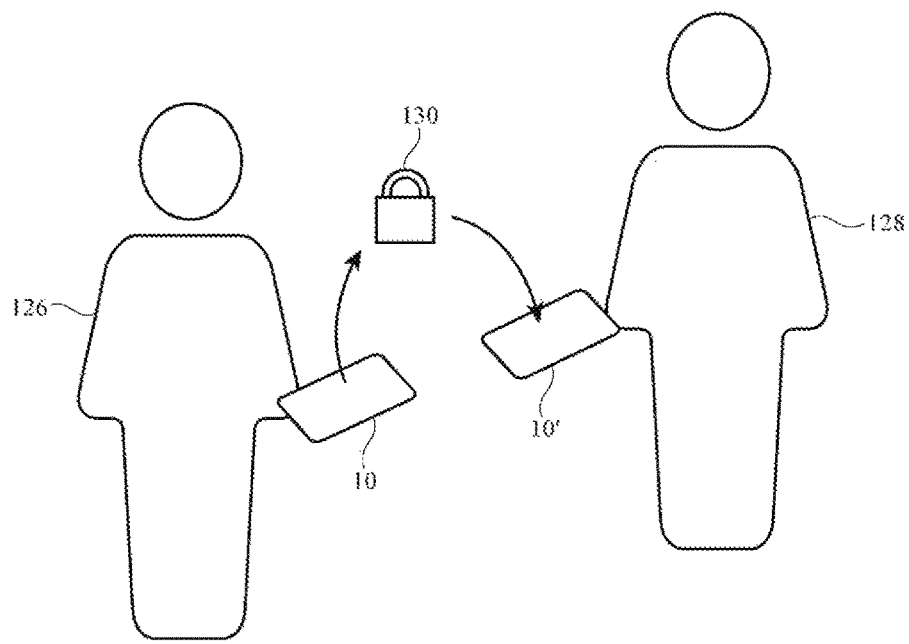
FIG. 19 is a diagram illustrating how information may be shared between two devices when the two devices are intentionally pointed towards one another in accordance with an embodiment.

FIG. 19 illustrates how device 10 may be configured to initiate a connection with nearby devices 10' when it detects that that the two devices are positioned in a certain way relative to one another. The relative position that triggers a connection between the two devices may sometimes be referred to as a "mutual look." A mutual look between two devices may occur when both devices are pointed at one another, when both devices are within a predetermined distance from one another, and/or when other suitable conditions are met indicating that user 126 wishes to connect his or her device 10 with device 10' of another user 128 (and that user 128 wishes to connect his or her device 10' with device 10 of user 126). A mutual look may generally be characterized by two devices pointing "intentionally" at one another (e.g., device 10 is being intentionally pointed towards device 10', and device 10' is being intentionally pointed towards device 10).

The conditions that must be met for control circuitry 22 to determine that a mutual look has occurred may sometimes be referred to as mutual look conditions. The mutual look conditions may be static (e.g., fixed) or may be dynamic and adjustable. Mutual look conditions may be adjusted based on the context in which device 10 is operating. For example, when there is a greater chance of unintentional proximity or pointing between devices (e.g., in a crowded room, an elevator, or other multiple-device scenario), control circuitry 22 may use a higher threshold to determine if a mutual look has occurred (e.g., a smaller distance and/or smaller angle between device 10 and device 10' may be required to establish a mutual look). In a less crowded room, on the other hand, control circuitry 22 may relax the threshold so that greater distances and larger angles between the two devices may be sufficient to establish a mutual look. Control circuitry 22 may adjust the mutual look parameters and thresholds based on how many people or devices are in the room with device 10, based on where device 10 is located (e.g., using a GPS receiver or other location detection circuitry), based on calendar information stored on device 10, and/or based on other data that may be indicative of the ambient environment in which device 10 is operating.

Once control circuitry 22 in device 10 determines that a mutual look has occurred, control circuitry 22 may initiate a connection with device 10'. Initiating a connection may include automatically establishing a connection with device 10' upon detecting a mutual look, or may include automatically notifying user 126 of device 10 of the opportunity to connect with device 10'. Once a connection has been established (either automatically in response to a mutual look or after user 126 has provided input), information 130 may be shared between device 10 and device 10'. Sharing information may include sending information 130 from device 10 to device 10' and/or may include device 10 receiving information from device 10'. Information 130 may be contact information, social media content, one or more photos or videos, documents, page, calendar data, location information, music data (e.g., a recommended song, album, etc.), an application (e.g., an application that user 128 can download to device 10'), a web page, or any other suitable information.

In arrangements where the connection is established automatically, information may automatically be shared between device 10 and device 10'. The sharing may occur immediately upon detection of a mutual look, or the sharing may occur a predetermined period of time after the mutual look (e.g., absent any user input indicating that he or she does not wish to share or connect with device 10'). Information 130 may be information that the user has previously identified or selected for sharing with one or more devices 10'.

In arrangements where control circuitry 22 notifies a user of the opportunity to connect before automatically sharing information, control circuitry 22 may present output to user 126 upon detecting a mutual look (e.g., visual output on display 14, audio output via one or more speakers, haptic output via one or more vibrators or actuators, and/or other suitable output). User 126 may then provide input to device 10. If the user input indicates a desire to share, control circuitry 22 may establish a connection with device 10', upon which information 130 may be exchanged with device 10' (e.g., information may be sent from device 10 to device 10' and/or from device 10' to device 10 once a connection has been established). The user input may be touch input (e.g., the user may provide touch input by tapping the information to be shared, by swiping the information to be shared towards the other device 10', or by providing other suitable types of touch input), gesture input (e.g., a shake or other movement of device 10'), audio input, or other suitable input.

Figures 20, 21, 22:
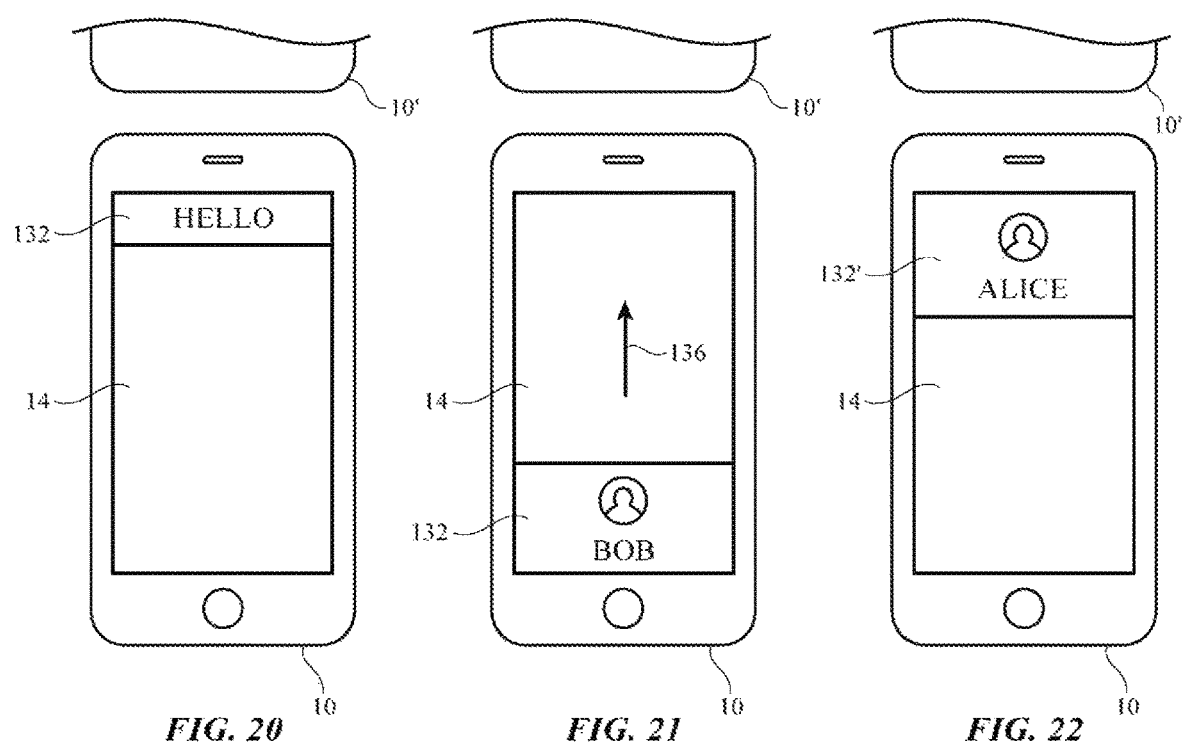
FIG. 20 is a top view of an illustrative image that may be displayed as two devices are pointed towards one another in accordance with an embodiment.
FIG. 21 is a top view of an illustrative image that may be displayed to present a user with an option to share information with another user in accordance with an embodiment.
FIG. 22 is a top view of an illustrative image that may be displayed upon receiving information from another user in accordance with an embodiment.

FIGS. 20, 21, and 22 show an illustrative sequence of screenshots that may be displayed on device 10 during and after a mutual look between device 10 of user 126 and device 10' of user 128, as described in connection with FIG. 19. FIG. 20 shows that an initial notification 132 may be displayed to inform the user that another device 10' is either in or approaching the mutual look position. Notification 132 may change (e.g., may become more prominent) as device 10' comes closer or is pointed more directly at device 10, or notification 132 may be static and may only appear when a mutual look has occurred.

Upon detecting a mutual look, control circuitry 22 may notify user 126 of the opportunity to share information with device 10' using a notification such as a visual notification, audio notification, haptic notification, or other suitable notification. As shown in FIG. 21, notification 132 may be displayed on display 14. Notification 132 may be a visual representation of information 130, a description of information 130, or a confirmation or authorization prompt that is presented to user 126 so that user 126 can authorize or deny sending information 130 to or receiving information from device 10'. In the example of FIG. 21, notification 132 may be a visual representation of contact information for user 126 of device 10 (e.g., an image of user 126 and associated contact information such as a phone number, email address, etc.), which may prompt to user 126 to decide whether user 126 wishes to share his or her contact information with device 10'. This is, however, merely illustrative. Notification 132 may correspond to other information (e.g., information 130 described in connection with FIG. 19), or any other suitable information on device 10 that can be shared or that has been previously identified as being information that user 126 wishes to share.

If desired, control circuitry 22 may predict what information 130 user 126 would want to share based on data from input-output devices (e.g., based on how close device 10 is to device 10', based on whether control circuitry 22 recognizes device 10' or has previously communicated with device 10', based on user input to a touch sensor in display 14, based on a user's location, based on gesture input gathered by a motion sensor in device 10, and/or based on data from other input-output devices), may be based on information stored on device 10 (e.g., calendar information), and/or may be based on other factors. For example, if a calendar stored on device 10 and/or a user's current location indicates that the user is at a networking event, control circuitry 22 may automatically present a contact information notification 132 which prompts the user to confirm or authorize sending his or her contact information to user 128.

Control circuitry 22 may send information 130 to device 10' automatically upon detection of a mutual look (e.g., after a predetermined period of time has passed without user 126 indicating that he or she does not wish to communicate with device 10') or may only send information 130 to device 10' upon receiving suitable user input from user 126. In one suitable arrangement, user 126 can provide touch input to display 14 to cause control circuitry 22 to send information 130 to device 10' (e.g., by swiping notification 132 towards device 10' in direction 136, or by providing any other suitable touch input). This is, however, merely illustrative. User input may be gesture or motion input (e.g., a shaking of device 10, an up-down or side-to-side movement of device 10, or other intentional movement of device 10 by user 126) gathered by a motion sensor, audio input gathered by a microphone, biometric input gathered by a biometric sensor (e.g., fingerprint detection, face detection, gaze tracking, etc.), image sensor data gathered by a camera, and/or other suitable type of user input.

User input may also be used to determine when user 126 does not wish to share information with device 10'. For example, touch input, motion input, audio input, or other suitable input may be used to prevent device 10 from sharing information with device 10'. If desired, the rapidity with which a user pulls device 10 away from device 10' may be compared with a threshold, where a faster pull away from device 10' signifies a desire not to connect with device 10', and a slower pull away from device 10' signifies that device 10 should continue to present the option to share until additional user input is received. Thresholds may be adjusted based on interactions between two devices. A rapid pull away from device 10' may, for example, result in a lower speed threshold for future interactions with device 10' so that the user can more easily prevent future connections with device 10'.

FIG. 22 shows how device 10 may receive information from device 10' after a mutual look has occurred. Information received from device 10' may be represented with a notification to user 126 such as notification 132' (e.g., a visual representation of the information received from device 10', a description of the information received from device 10', an audio or haptic notification of the information received from device 10', or other suitable notification of information received from device 10'). Information from device 10' may be automatically accepted by device 10 and displayed on display 14 upon detection of a mutual look, or information may be accepted by device 10 upon receiving suitable user input from user 126. The user input may be the same user input that user 126 provides to send information 130 to device 10' (e.g., user input indicating a desire to connect with or send information to device 10' may also cause circuitry 22 to accept information from device 10'), or the user input may be separate user input that is specifically associated with receiving information from device 10' (e.g., may be a user's response to a prompt that informs the user of the option to receive information from device 10'). Any suitable information may be received from device 10'. In the example of FIG. 22, device 10 has received contact information (e.g., contact information associated with user 128) from device 10'. Notification 132' may be an image of user 128 indicating that the contact information of user 128 has been received (e.g., a phone number, email address, or other contact information associated with user 128).

Figure 23:
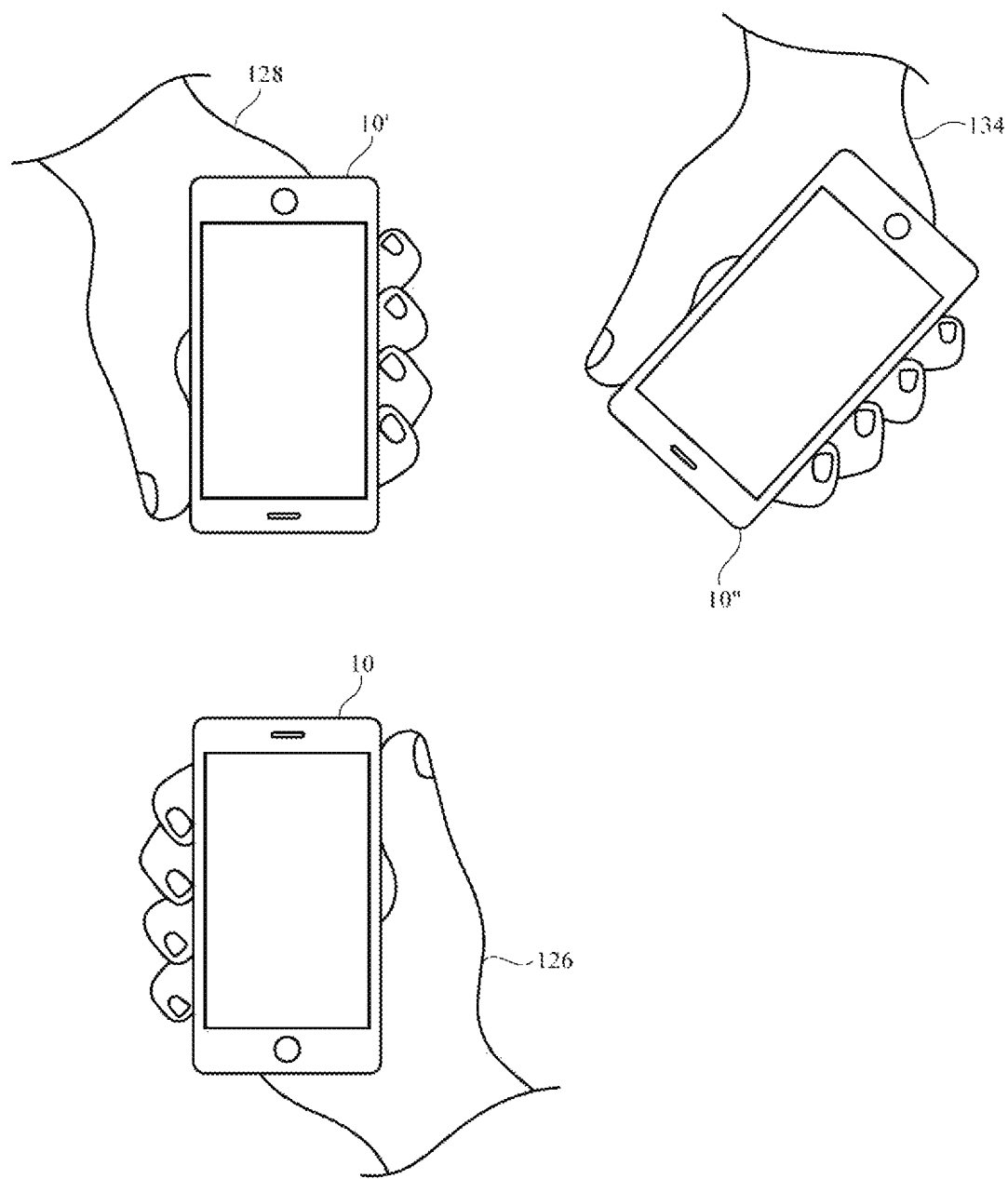
FIG. 23 is a top view of illustrative electronic devices that may establish new connections with unrecognized devices and maintain connections with recognized electronic devices in accordance with an embodiment.

Once device 10 has established a connection with device 10' over a wireless communications link, the connection may be broken by user 126 moving device 10 away from device 10' (or providing other suitable input). If desired, a connection with device 10' may persist even after user 126 moves device 10 away from device 10'. For example, a mutual look may be used to establish a semi-permanent connection or memory between device 10 and device 10', which may then cause control circuitry 22 to take certain actions when device 10' is in the vicinity of device 10. An illustrative example of this type of arrangement is shown in FIG. 23.

Consider a scenario in which device 10' of user 128 is not one that device 10 has communicated with before (e.g., no previous mutual look between device 10 and device 10' has occurred). In order to establish a connection with device 10' and share information with device 10', user 126 and user 128 may bring devices 10 and 10' within the predetermined distance and orientation to establish a mutual look. Device 10" of user 134, on the other hand, may be one that device 10 has communicated with previously (e.g., after a mutual look, or via email, text, phone call, or other suitable communication method). Control circuitry 22 may recognize device 10" and may take suitable action upon detecting device 10". For example, a mutual look may not be required for device 10 to inform user 126 of the presence of device 10" and user 134. Rather, a lower threshold of position and orientation of device 10 relative to device 10" may be used to trigger a notification to user 126 of the presence of device 10". When device 10" is within a certain distance of device 10, for example, control circuitry 22 may inform user 126 of the presence of device 10" (e.g., may present notification 132 of FIG. 21), even if device 10 and device 10" are not pointed directly towards one another. If desired, the notification 132 to user 126 may be tailored to the knowledge that device 10 already has about device 10".

Figure 24:
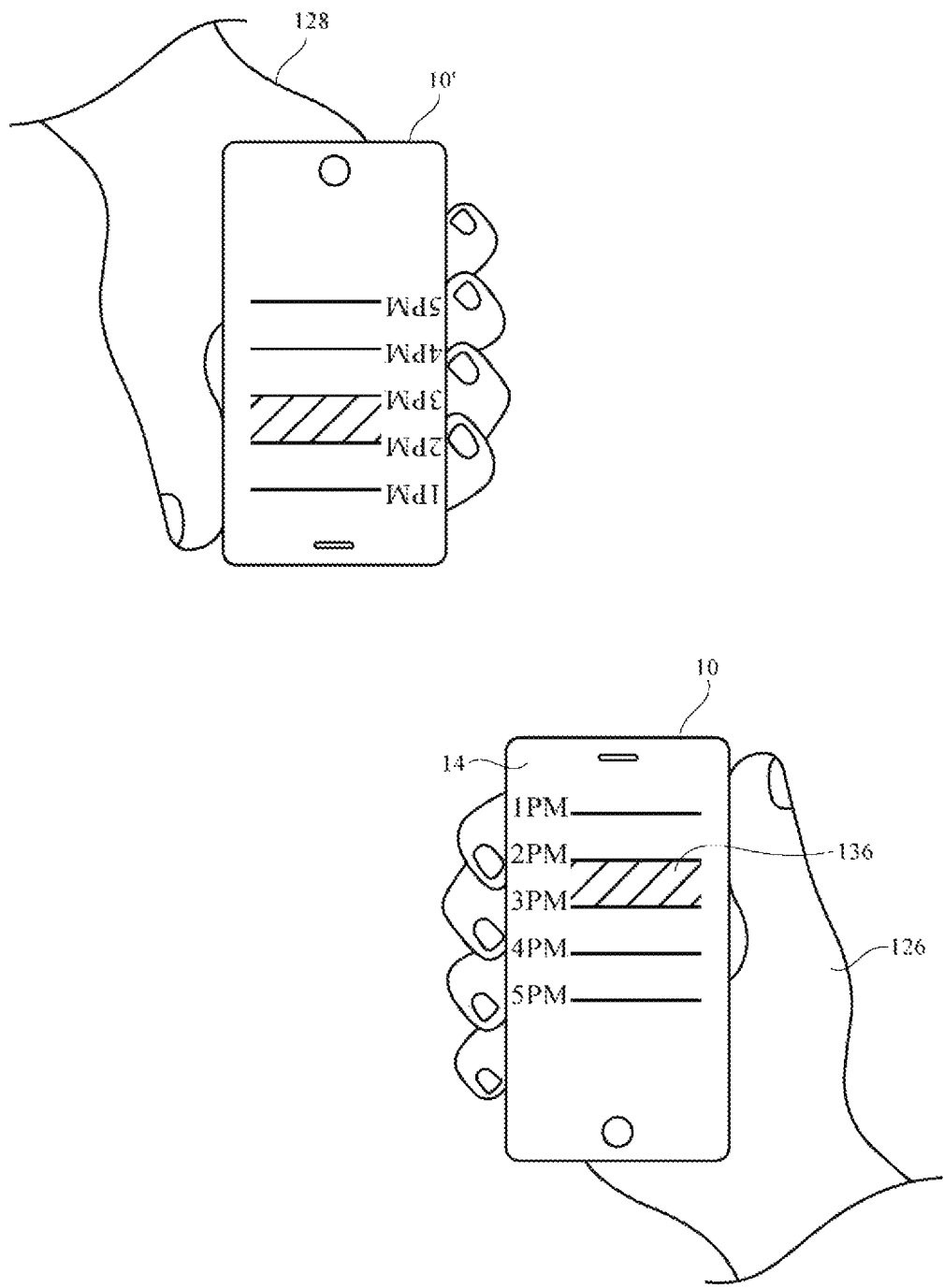
FIG. 24 is a top view of illustrative electronic devices displaying images of mutual calendar openings based on information that is shared between the two electronic devices in accordance with an embodiment.

When a connection has been established between device 10 and device 10' (or device 10"), control circuitry 22 may automatically take certain actions. Control circuitry 22 may automatically prompt user 126 to share certain information. For example, control circuitry 22 may sync photos with device 10', may identify and reveal similarities or differences between device 10 and device 10' (e.g., shared musical tastes, unshared musical tastes, shared photo locations, mutually available calendar dates, shared social media connections, etc.). As shown in FIG. 24, for example, control circuitry 22 may exchange calendar information with device 10' upon establishing a connection with device 10'. Based on calendar data received from device 10' and calendar data stored on device 10, control circuitry 22 may identify mutually available time slots that are open for both user 128 and user 126. Display 14 may display a calendar image highlighting or otherwise indicating the mutually available time slot 136.

Figure 25:
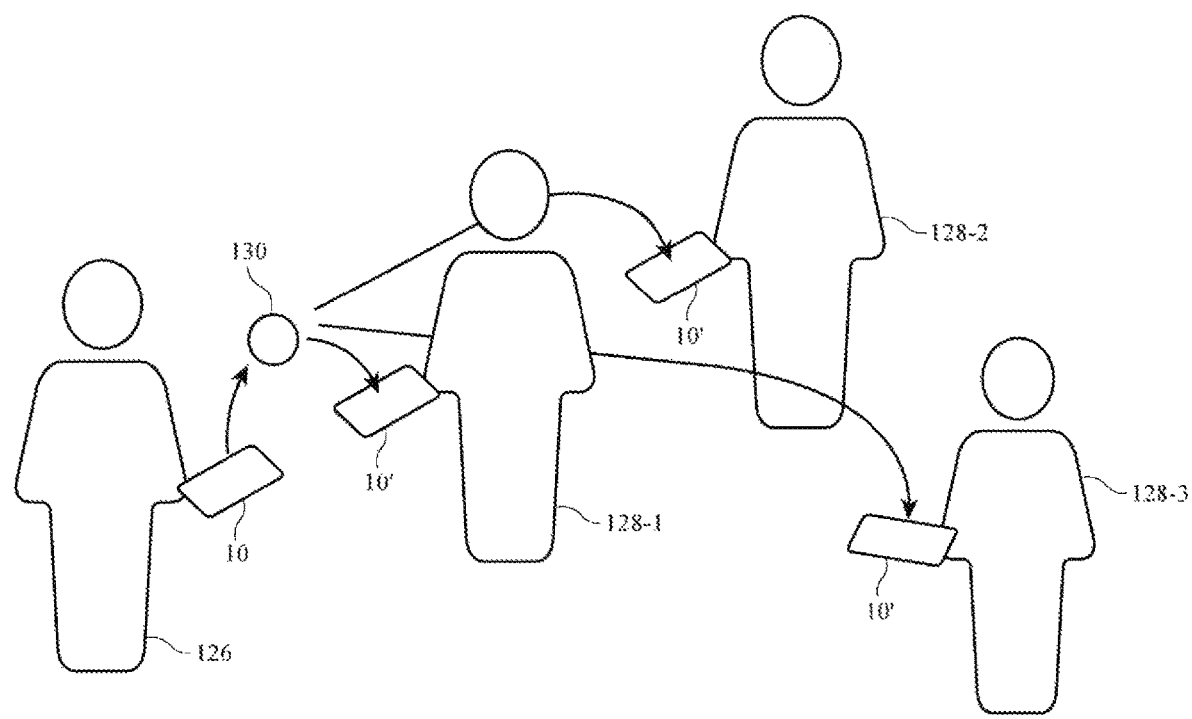
FIG. 25 is a diagram illustrating how a user may share information with one or more devices in a group in accordance with an embodiment.
Figure 26:
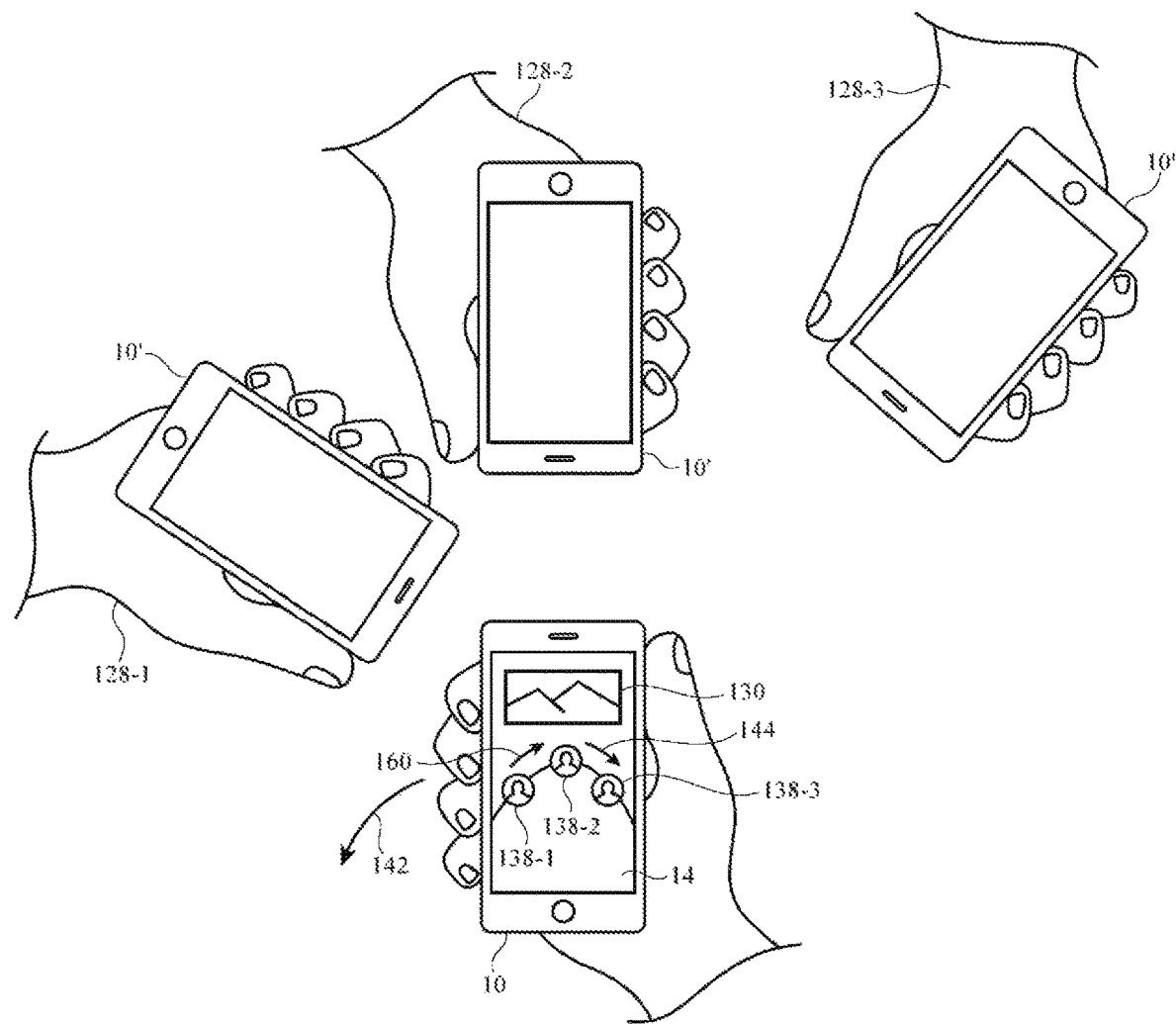
FIG. 26 is a top view of illustrative electronic device in which a sharing device displays icons according to the location of nearby devices to assist a user in selecting which device the user wishes to share information with in accordance with an embodiment.

FIG. 25 illustrates a scenario in which user 126 of device 10 may have the option of sharing with multiple users in the vicinity of user 126. As shown in FIG. 26, users 128-1, 128-2, and 128-3 have devices 10' that are within the vicinity of device 10. In some scenarios, devices 10' may all be positioned and oriented relative to device 10 such that a mutual look is established between device 10 and devices 10' (e.g., in which each device 10' is intentionally pointing at device 10 and vice versa, as described in connection with FIG. 19). In other scenarios, a mutual look between each pair of devices may not be required in order to initiate sharing. Instead, user 126 may provide user input to device 10 indicating that he or she wishes to share information with one or more devices in the vicinity of device 10. For example, user 126 may select a "share" icon on display 14 or may provide other suitable user input indicating that user 126 wishes to share information 130 with nearby devices. When this sharing is initiated by user 126, device 10 may be able to share information with devices 10' without requiring users 128-1, 128-2, and 128-3 to point their devices towards device 10.

When control circuitry 22 determines that there are more than one device 10' in the vicinity of device 10, control circuitry 22 may prompt user 126 to select which user(s) user 126 wishes to send information 130 to. FIG. 26 illustrates how control circuitry 22 may prompt user 126 to select one or more nearby users with which user 126 wishes to share information 130 (e.g., a photograph or other suitable information). Upon receiving input from user 126 that user 126 wishes to share information 130 (or in response to determining that a mutual look with multiple devices has occurred), control circuitry 22 may use display 14 to show user 126 which users are within the vicinity of device 10. As shown in FIG. 26, display 14 may display an icon representing each nearby user. If desired, the location of the icon on display 14 may be based on the location of the associated device 10' relative to device 10. For example, icon 138-1 representing device 10' of user 128-1 to the left of user 126 may be located on the left hand side of display 14; icon 138-2 representing device 10' of user 128-2 in front of user 126 may be located at the center of display 14; and icon 138-3 representing device 10' of user 128-3 to the right of user 126 may be located on the right hand side of display 14.

If desired, control circuitry 22 may monitor the location of devices 10' relative to device 10 and may change the location of icons on display 14 according to where devices 10' are positioned relative to device 10. For example, if user 126 moves device 10 in direction 142 so that device 10 is pointing towards device 10' of user 128-1, icon 138-1 may shift in direction 160 to the center of display 14, icon 138-2 may shift in direction 144 to the right hand side of display 14, and icon 138-3 may shift further to the right on display 14 or may be removed from display 14.

To send information 130 to a nearby device, user 126 may select the corresponding icon on display 14. For example, a user may select icon 138-1 to share information 130 with device 10' of user 128-1, icon 138-2 to share information 130 with device 10' of user 128-2, and/or icon 138-3 to share information 130 with device 10' of user 128-3. In another suitable arrangement, user 126 may swipe up on information 130 to send information 130 to the device 10' that device 10 is pointing towards. User 126 may use icons 138-1, 138-2, and 138-3 to determine which device 10' the information would go to upon swiping (e.g., a swipe up on information 130 may cause information 130 to be sent to whichever device is represented at the center of display 14). This is merely illustrative, however. If desired, any other suitable type of user input may be used to cause control circuitry 22 to send information 130 to one or more devices 10' in the vicinity of device 10.

In situations where user 126 wishes to share information 130 with multiple devices (e.g., belonging to a group of users), it may be desirable to broadcast the information and allow each device in the group to retrieve the information by taking actions on their own devices. This may help user 126 share information more efficiently than having user 126 individually select which users it wishes to send information to. An example of this type of arrangement is shown in FIG. 27.

Figure 27:
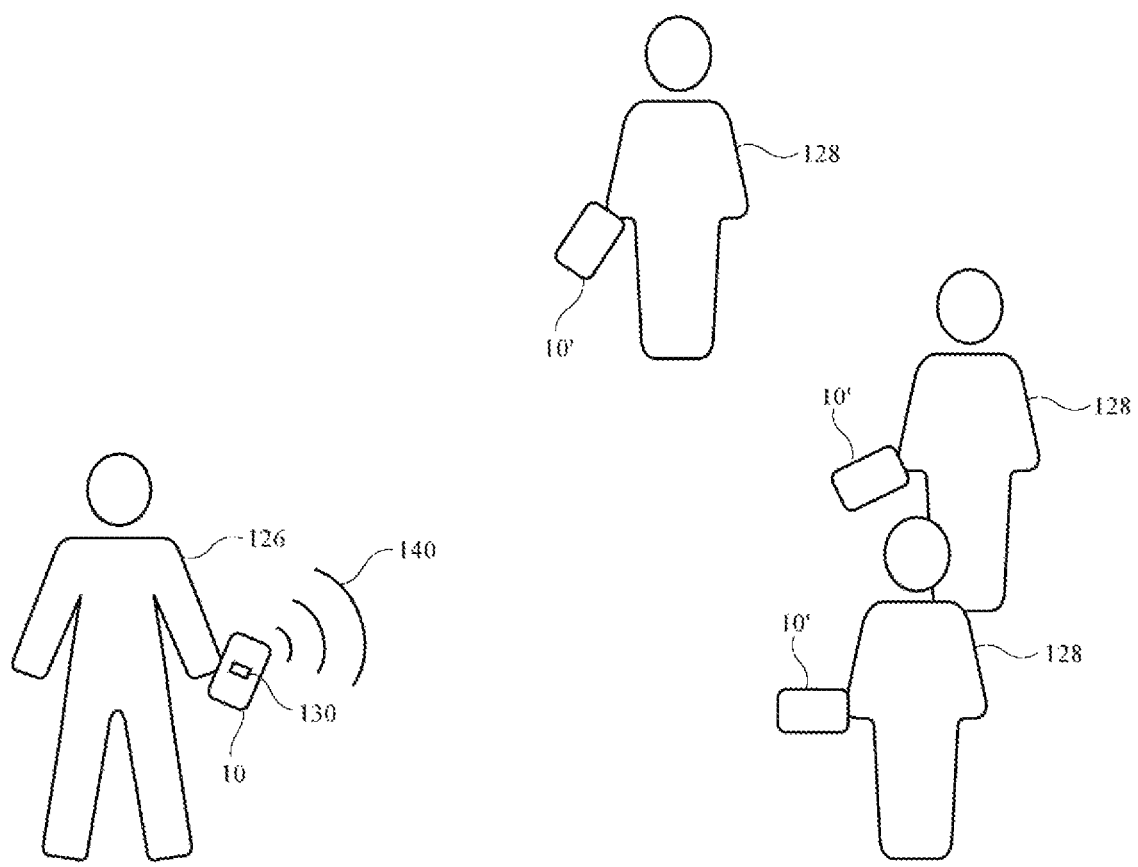
FIG. 27 is a diagram illustrating how a user may broadcast a signal from his or her electronic device and other users may receive the signal by pointing their devices at the broadcasting device in accordance with an embodiment.

As shown in FIG. 27, user 126 may wish to share information 130 with a group of users 128. This can be achieved using a method of the type described in connection with FIGS. 19, 25, or 26 where user 126 selects or gestures towards the user(s) that user 126 wishes to share with, or it can be achieved using a broadcasting method of the type illustrated in FIG. 27. Broadcasting may be initiated automatically in response to certain environmental or other context-specific conditions, and/or may be initiated in response to user input. For example, user 126 may select which information 130 he or she wishes to share and may select a broadcast method for sharing. Upon receiving this user input, control circuitry 22 may begin broadcasting signal 140 associated with information 130 (e.g., a wireless signal of the type described in connection with FIG. 7). Signal 140 may include a notification for alerting nearby users that content 130 is available for sharing, or signal 140 may be content 130 itself.

In some implementations, users 128 need not take any action before receiving signal 140. With this type of arrangement, devices 10' may automatically receive signal 140 that causes each device 10' to present a notification to users 128 that content 130 from device 10 is available. After receiving signal 140, each device 10' may automatically establish a connection with device 10 to download content 130, or device 10' may wait to detect user input indicating that user 128 wishes to receive content 130. The user input may be an intentional pointing of device 10' towards the source of signal 140, touch input to device 10', a gesturing of device 10' towards device 10, or other suitable input to device 10'.

In other implementations, users 128 must take action before receiving signal 140 (e.g., by pointing devices 10' at device 10, by providing touch input to devices 10', by gesturing devices 10' towards device 10, or by providing other suitable input to devices 10').

The broadcast method of FIG. 27 allows user 126 to easily share information without requiring user 126 to take any additional action (e.g., user 126 need not point device 10 at any device 10' in the group in order to send information 130 to devices 10').

Devices 10' may include circuitry similar to that of device 10 (e.g., a display, wireless communications circuitry, and other circuitry of the type shown in FIG. 2). Device 10' may automatically display an option to receive content 130 upon receiving signal 140 using wireless communications circuitry and/or upon detecting an intentional pointing of device 10' towards the source of signal 140 (i.e., towards device 10). When user 128 provides appropriate user input indicating that user 128 wishes to receive or subscribe to content 130 (e.g., via touch input, gesture input, or a continued intentional pointing of device 10' towards device 10), control circuitry in device 10' may receive content 130 (e.g., using wireless communications circuitry) and may present the information to user 128 (e.g., using a display).

If desired, the broadcasting device 10 may be used to control the output on devices 10' by changing signal 140. As long as devices 10' are voluntarily subscribing to signal 140, user 126 can change the content of information 130 and control circuitry 22 may change signal 140 accordingly so that the output on devices 10' corresponds to the updated content of information 130 (e.g., the content on devices 10' may be synced in time and location with the content on device 10). For example, if information 130 is a song that user 126 is sharing with users 128, devices 10' may play the same song (in sync with device 10) upon receiving signal 140 from device 10. If the user pauses the song or skips to the next song on device 10, control circuitry 22 may change signal 140 accordingly such that the song is also paused or skipped on devices 10'. Other examples of control commands that user 126 can send over signal 140 to control the output on devices 10' include video control commands (e.g., playing, pausing, or otherwise controlling video output on device 10'), web page control commands (e.g., scrolling up or down on a web page on device 10'), photo browsing control commands (e.g., browsing through photos on device 10'), and/or other types of control commands. The commands sent to device 10' may mirror the commands that user 126 provides to information 130 on device 10.

Figure 28:
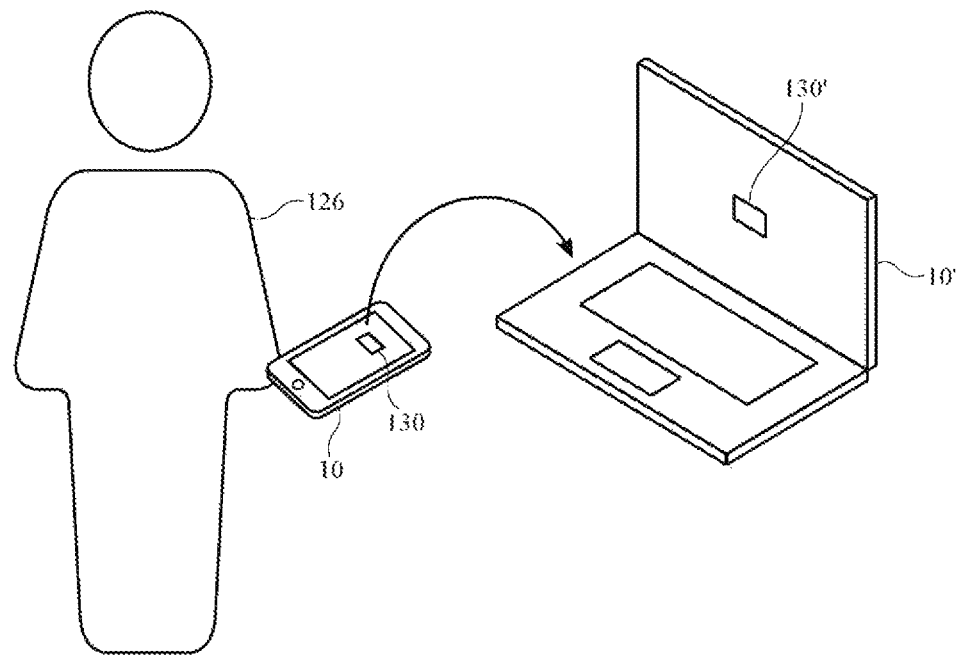
FIG. 28 is a perspective view illustrating how a user may share information between two or more of the user's devices in accordance with an embodiment.

In some situations, user 126 may have multiple devices and may wish to and intuitively share information among his or her devices and/or to easily switch from one device to another. FIG. 28 illustrates an example in which user 126 wishes to view information 130 (that the user has on first device 10) on second device 10'. In one illustrative example, both device 10 and device 10' belong to user 126. When devices 10 and 10' both belong to the same user, sharing between the two devices may be initiated more easily (with less friction) than when the two devices are owned by different people. Control circuitry 22 may still monitor input-output circuitry 24 to determine when a possible sharing opportunity between device 10 and device 10' has arisen, but the threshold for predicting such a scenario may be lower to enable a more seamless sharing experience between the multiple devices. For example, the minimum threshold distance and angle(s) required between device 10 and device 10 to trigger a sharing opportunity (see, e.g., FIG. 9) may be larger, so that sharing is more easily initiated. If desired, different or fewer parameters may be monitored (e.g., proximity alone without any minimum angle requirement may be sufficient to initiate sharing between device 10 and device 10' when the two devices are owned by the same user). Once these relaxed conditions are met (e.g., when the two devices are within a predetermined distance of one another), control circuitry 22 may automatically share information 130 with device 10' or may prompt user 126 to confirm that he or she wishes to share information 130 with device 10'.

In some situations, device 10 and device 10' may both store similar sets of information. For example, a file may be stored on device 10 and device 10', or both devices may be synced to the same set of data on a cloud server. In this type of scenario, device 10 need not send information 130 to device 10'. Rather, device 10 may send a signal to device 10' that instead causes device 10' to locate and open information 130' on device 10' (or download information 130' from a cloud server).

Figure 29:
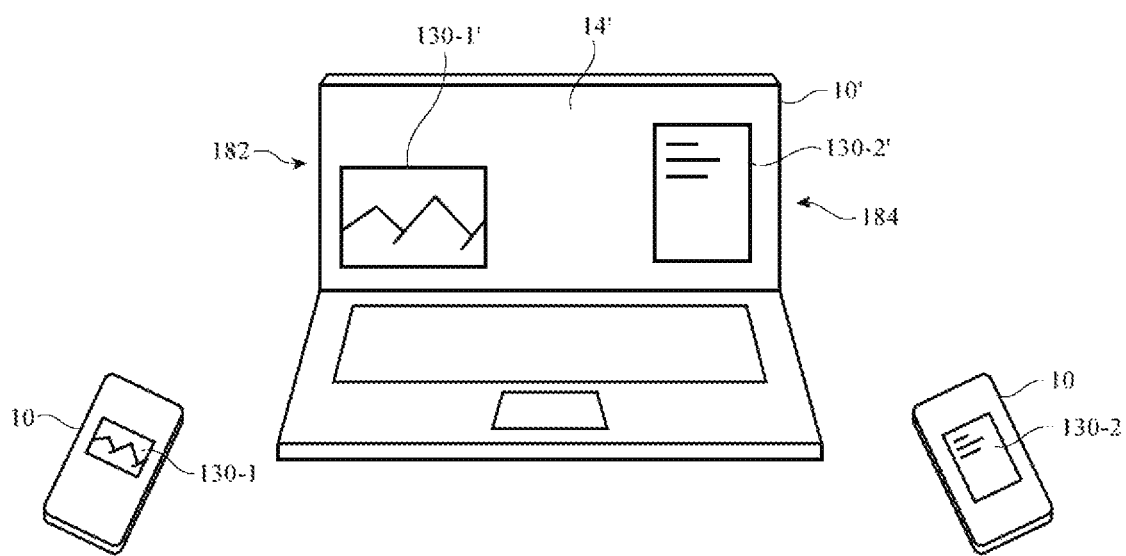
FIG. 29 is a perspective view illustrating how the location of shared information on a display of the receiving device may be based on the location of the sending device relative to the receiving device in accordance with an embodiment.

FIG. 29 illustrates how a user may control the output on device 10' by manipulating device 10. When device 10 is pointed towards or held near left hand side 182 of device 10', information 130-1 that the user is sharing from device 10 may appear on the left hand side of display 14' (see information 130-1' near side 182 of device 10'). When device 10 is pointed towards or held near right hand side 184 of device 10, information 130-2 that the user is sharing from device 10 may appear on the right hand side of display 14' (see information 130-2' near side 184 of device 10). The location of the information on display 14' may be based on the signals that device 10 sends to device 10' (e.g., indicating where on display 14' the information should be displayed) or may be based on information from sensors in device 10' that determine where device 10 is located relative to device 10'.

As in the example of FIG. 27, the sending device 10 may be used to control the output on receiving device 10' by changing the signal from device 10. For example, the content on devices 10' may be synced in time and location with the content on device 10 (e.g., user 126 can control the song, video, document, web page, photo, or other output on device 10' by manipulating the content on device 10 and sending corresponding media control commands to device 10').

Figure 30:
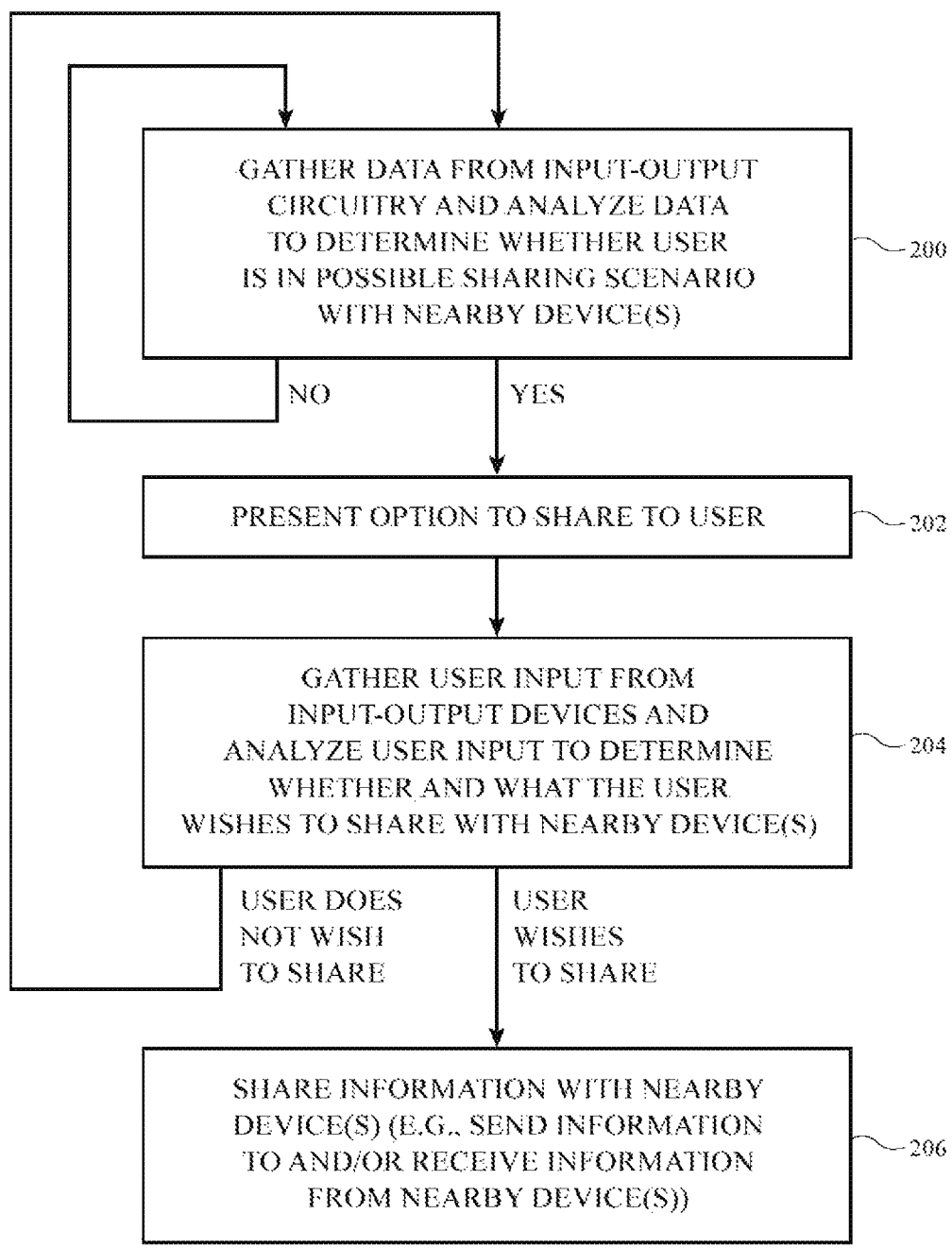
FIG. 30 is a flow chart of illustrative steps involved in operating an electronic device with intuitive sharing capabilities of the type described in connection with FIGS. 1-29 in accordance with an embodiment.

A flow chart of illustrative steps involved in operating a device with intuitive sharing capabilities is shown in FIG. 30.

At step 200, control circuitry 22 may monitor data from input-output circuitry 24 to determine when user 126 of device 10 is in a possible sharing scenario with nearby device(s). A sharing scenario may arise between device 10 and device 10' when the two devices are close enough to establish a wireless communications link. The data may include data from a touch sensor (e.g., a touch sensor in display 14 or other suitable touch sensor), wireless communications circuitry 36, proximity sensors (e.g., infrared proximity sensors or other proximity sensors), motion sensors 32 (e.g., data from an accelerometer, a gyroscope, a compass, or other suitable motion sensor), camera 30, and/or other circuitry in device 10. Control circuitry 22 may monitor the data for user input (e.g., a gesture, motion, positioning or pointing, audio input, touch input, or other user input) indicating user 126 wishes to share or connect with another device. Control circuitry 22 may also monitor the data to predict when user 126 wishes to share or connect with another device without requiring the user to provide input to device 10. This may include monitoring the position and orientation of device 10 relative to other devices 10' and/or monitoring characteristics of the user's environment. If desired, different parameters with different thresholds (e.g., context-based thresholds such as minimum distances and minimum angles that are based on the number of people or devices in the same room as device 10) may be used to analyze data from input-output circuitry 24.

If no possible sharing scenario is detected (e.g., no user input indicating a desire to share and/or no detection of a nearby electronic device within sharing range), processing loops back to step 200 and control circuitry 22 continues to monitor data from input-output circuitry 24 for possible sharing opportunities. If a possible sharing scenario is detected in step 200, processing proceeds to step 202.

At step 202, control circuitry 22 provides the user with information about the sharing option. This may include prompting user 126 to confirm or select what information user 126 wishes to share, to confirm or select which user or device 10' user 126 wishes to share with, to confirm how the information should be sent (e.g., via a broadcasted signal that is available to multiple users, via a signal that is designated for a specific device, via a signal that causes a receiving device owned by user 126 to open up an identical file on that device, etc.), and/or to confirm or provide other input before information is shared with another device 10'.

At step 204, control circuitry 22 may gather and analyze data from input-output devices to determine if information should be shared with another device and if so, which information should be shared. This may include, for example monitoring user input such as a touch, a swipe, a motion or gesture, an audio input, or other user input. This may include comparing the speed with which a user pulls device 10 away from device 10' to determine if the pulling away signifies an intentional indication that the user does not wish to connect with device 10' or if the pulling away was an unintentional movement of device 10 that should not disrupt sharing.

If desired, control circuitry 22 may monitor user input for a certain time period. The user may adjust the settings on device 10 such that information is automatically sent at the end of the time period (absent user input indicating the user does not wish to share), or the settings may be adjusted such that information is only sent if the user actively confirms or otherwise authorizes the sharing within the time period.

If control circuitry 22 determines that the user does not wish to share, processing loops back to step 200 and control circuitry 22 continues to monitor data from input-output circuitry 24 for possible sharing opportunities. If control circuitry 22 determines that the user does wish to share (and determines which information the user wishes to share), processing proceeds to step 206.

At step 206, control circuitry 22 may share information with device 10'. This may include, sending information to and receiving information from device 10', may include only sending information to device 10', may include only receiving information from device 10', or may include sending a signal to device 10' that causes device 10' to open up information that is already stored on device 10'. Information may be shared between device 10 and device 10' over a wireless communications link using wireless communications signals (e.g., Bluetooth® signals, near-field communications signals, wireless local area signals such as IEEE 802.11 signals, millimeter wave communication signals such as signals at 60 GHz, ultra-wideband radio frequency signals, other radio-frequency wireless signals, infrared signals, etc.).

The examples of FIGS. 12-30 in which control circuitry 22 uses display 14 to provide a user of device 10 with a visual indication of the presence, location, orientation of, option to share with, and/or connection to nearby devices is merely illustrative. If desired, control circuitry 22 may supplement or replace the visual aid of display 14 with audio output from speakers 34, haptic output from one or more vibrators or actuators, light-based output from one or more light sources, or other informative output. Similar to how images on display 14 may change location, shape, color, etc. to help inform the user of where nearby devices 10' are located and when wireless communications links are established, output from other output devices may be adjusted to provide this type of information. For example, an audible beeping, a vibration, a haptic actuator output, or a light pulse on the left side of device 10 may indicate the presence, proximity, or wireless communications capabilities of a device 10' on the left hand side of device 10. Any suitable characteristic of the output may be adjusted to alert the user of an approaching device, an established or broken wireless connection, proximity, orientation (e.g., the volume or tone of the audio output, the intensity or frequency of the vibration or haptic actuator output, the brightness of the light pulse, etc.).

The foregoing is merely illustrative and various modifications can be made to the described embodiments. The foregoing embodiments may be implemented individually or in any combination.

What is claimed is:

1. A method for operating a first electronic device having a longitudinal axis, input-output circuitry, control circuitry, and a display, the method comprising:
   with the input-output circuitry, gathering data;
   with the control circuitry, determining a position of the first electronic device relative to the second electronic device based on the data, wherein determining the position of the first electronic device relative to the second electronic device comprises determining whether the first electronic device is in proximity to a second electronic device and whether the longitudinal axis is aligned with a longitudinal axis of the second electronic device based on the data; and
   in response to determining that the first electronic device is in proximity to the second electronic device and that the longitudinal axis is aligned with the longitudinal axis of the second electronic device, automatically displaying an option to share information with the second electronic device on the display, wherein the control circuitry selects a type of information to share at least partly based on whether the longitudinal axis is aligned with the longitudinal axis of the second electronic device.

2. The method defined in claim 1 wherein determining whether the first electronic device is in proximity to the second electronic device and whether the longitudinal axis is aligned with the longitudinal axis of the second electronic device comprises:
   determining a distance between the first electronic device and the second electronic device; and
   determining an orientation of the first electronic device relative to the second electronic device.

3. The method defined in claim 2 further comprising:
   with the control circuitry, determining whether the second electronic device is aligned towards the first electronic device, wherein the option to share information with the second electronic device is displayed partly in response to determining that the second electronic device is aligned towards the first electronic device.

4. The method defined in claim 1 wherein displaying the option to share information with the second electronic device on the display comprises displaying contact information associated with a user of the first electronic device.

5. The method defined in claim 4 wherein the first electronic device comprises wireless communications circuitry, the method further comprising:
   with the input-output circuitry, receiving user input after displaying the option to share information with the second electronic device; and
   with the wireless communications circuitry, sending the information to the second electronic device in response to the user input.

6. The method defined in claim 5 wherein receiving user input comprises receiving touch input.

7. The method defined in claim 6 wherein the touch input comprises a swipe on the display in which the user swipes the contact information towards the second electronic device.

8. A method for operating a first electronic device comprising input-output circuitry, control circuitry, and a display, wherein the input-output circuitry comprises at least one antenna, the method comprising:
   with the at least one antenna, receiving radio waves from a second electronic device that stores data;
   with the control circuitry, determining an angle of arrival of the received radio waves and determining based on the angle of arrival that the first electronic device is pointed towards the second electronic device; and
   with the display, automatically displaying an option to receive the data in response to determining that the first electronic device is pointed towards the second electronic device and without requiring touch input on the display, wherein the second electronic device has an orientation and wherein the option to receive data is displayed regardless of the orientation.

9. The method defined in claim 8 wherein the first electronic device comprises wireless communications circuitry, the method further comprising:
   with the input-output circuitry, receiving user input;
   with the wireless communications circuitry, receiving the data from the second electronic device in response to the user input; and
   with the display, providing output corresponding to the received signal.

10. The method defined in claim 9 wherein the signal includes control commands that control the output on the display.

11. A method for operating a first electronic device in the vicinity of second electronic devices, wherein the first electronic device comprises input-output circuitry, control circuitry, and a display, the method comprising:
   with the input-output circuitry, receiving user input;
   with the control circuitry, determining an angle of arrival of ultra-wideband radio waves received from each of the second electronic devices; and
   with the display, displaying options to share information with the second electronic devices, wherein the options are positioned on the display based on the angle of arrival of the ultra-wideband radio waves received from each of the second electronic devices.

12. The method defined in claim 11 wherein a size of each of the options on the display is based on a proximity of each of the second electronic devices.

13. The method defined in claim 12 wherein the options include icons on the display, each icon corresponding to an associated one of the second electronic devices, the method further comprising:
  with the control circuitry, detecting a change in the angle of arrival of the radio waves received from a given one of the second electronic devices; and
  with the display, changing the position of a given one of the icons on the display in response to the change the angle of arrival, wherein the given one of the icons is associated with the given one of the second electronic devices.

14. The method defined in claim 13 wherein detecting the change in the angle of arrival of the radio waves received from the given one of the second electronic devices comprises determining that the first electronic device is pointed towards the given one of the second electronic devices, and wherein changing the position of the given one of the icons on the display comprises moving the given one of the icons to the middle of the display.

15. The method defined in claim 11 wherein the first electronic device comprises wireless communications circuitry, the method further comprising:
  with the input-output circuitry, receiving additional user input after displaying the options to share information with the second electronic devices; and
  with the wireless communications circuitry, sending the information to a given one of the second electronic devices in response to the additional user input.

16. The method defined in claim 15 wherein receiving the additional user input comprises receiving touch input.

17. A method for operating a first electronic device having wireless communications circuitry and a display with first and second opposing sides, the method comprising:
  with the wireless communications circuitry, receiving a signal from a second electronic device displaying an image;
  with the wireless communications circuitry, determining whether the second electronic device is closer to the first side or second side of the display; and
  with the display, displaying the image in response to receiving the signal, wherein the image is displayed on a first portion of the display when the second electronic device is closer to the first side of the display and is displayed on a second portion of the display when the second electronic device is closer to the second side of the display.

18. The method defined in claim 17 further comprising:
  receiving an additional signal from the second electronic device, wherein the additional signal comprises a control command that causes the display to adjust the image being displayed.

19. The method defined in claim 17 wherein the image is selected from the group consisting of: a document, a web page, and a photograph.

* * * * *